US012602413B1

(12) United States Patent　　　　　　(10) Patent No.:　US 12,602,413 B1
Ezrielev et al.　　　　　　　　　　　　(45) Date of Patent:　Apr. 14, 2026

(54) MANAGING GENERATIVE ARTIFICIAL INTELLIGENCE (AI) MODEL OUTPUTS USING EXPLAINABILITY REPORTS

(71) Applicant: Dell Products L.P., Round Rock, TX (US)

(72) Inventors: Ofir Ezrielev, Be'er Sheva (IL); Hanna Yehuda, Acton, MA (US); Anne-Marie Mcreynolds, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/191,776

(22) Filed: Apr. 28, 2025

(51) Int. Cl.
　　　*G06F 16/3329*　　(2025.01)
　　　*G06F 16/332*　　(2025.01)
(52) U.S. Cl.
　　　CPC .... *G06F 16/33295* (2025.01); *G06F 16/3328* (2019.01)
(58) Field of Classification Search
　　　CPC ...................... G06F 16/33295; G06F 16/3328
　　　See application file for complete search history.

(56) References Cited

U.S. PATENT DOCUMENTS 11,120,365 B2　　9/2021　Campos et al.
11,651,216 B2　　5/2023　Dalli et al.

2024/0070495 A1 *　2/2024　Satish ..................... G06F 40/56
2024/0193821 A1 *　6/2024　Denison .............. G06F 3/04845
2024/0296278 A1 *　9/2024　Grimshaw .............. G06F 40/40
2025/0307372 A1 *　10/2025　Bayldon ............. G06F 21/6245
2025/0322306 A1 *　10/2025　Ahmadia ................ G06F 16/38
2026/0010591 A1 *　1/2026　Rodriguez Bravo ... G06F 21/31

OTHER PUBLICATIONS

Johannes Schneider, "Explainable Generative AI (GenXAI): A Survey, Conceptualization, and Research Agenda", arXiv:2404. 09554v1, Apr. 15, 2024, retrieved from < https://arxiv.org/abs/2404. 09554> on Apr. 25, 2025 (47 pages).

(Continued)

*Primary Examiner* — Etienne P Leroux
(74) *Attorney, Agent, or Firm* — WOMBLE BOND DICKINSON (US) LLP

(57) ABSTRACT

Methods and systems for providing computer-implemented services using generative AI models are disclosed. To do so, a prompt may be obtained for a generative AI model of the generative AI models. The prompt and the generative AI model may be used to obtain a first output. An output explainability process may be performed using at least the prompt, the first output, and the generative AI model to obtain an explainability report for the first output. The explainability report may indicate relationships between first information elements of the prompt and second information elements of the first output. The relationships may be based, at least in part, on a second output generated by the generative AI model using a modified prompt based on the prompt. The first output and the explainability report may be provided to a downstream consumer as part of providing computer-implemented services to the downstream consumer.

20 Claims, 13 Drawing Sheets

(56) References Cited

OTHER PUBLICATIONS

Sun et al., "Investigating Explainability of Generative AI for Code through Scenario-based Design", arXiv:2202.04903v1, Feb. 10, 2022, retrieved from <https://arxiv.org/abs/2202.04903> on Apr. 25, 2025 (17 pages).

Vaeth et al., "Generative Example-Based Explanations: Bridging the Gap between Generative Modeling and Explainability", arXiv:2410.20890v1, Oct. 28, 2024, retrieved from <https://arxiv.org/abs/2410.20890> on Apr. 25, 2025 (14 pages).

Gabriela Ben Melech Stan et al., "FASTRM: An Efficient and Automatic Explainability Framework for Multimodal Generative Models", arXiv:2412.01487, Apr. 1, 2025, retrieved from <https://arxiv.org/abs/2412.01487> on Apr. 25, 2025 (12 pages).

Najjar et al., "Leveraging Explainable AI for LLM Text Attribution: Differentiating Human-Written and Multiple LLMs-Generated Text", arXiv:2501.03212v1, Jan. 6, 2025, retrieved from <https://arxiv.org/abs/2501.03212> on Apr. 25, 2025 (25 pages).

Yongchen Zhou and Richard Jiang, "Advancing Explainable AI Toward Human-Like Intelligence: Forging the Path to Artificial Brain", arXiv:2402.06673v1, Feb. 7, 2024, retrieved from <https://arxiv.org/abs/2402.06673> on Apr. 25, 2025 (13 pages).

Sushri et al., "Combining Cognitive and Generative AI for Self-explanation in Interactive AI Agents", arXiv:2407.18335v1, Jul. 25, 2024, retrieved from <https://arxiv.org/abs/2407.18335> on Apr. 25, 2025 (10 pages).

Bugueño et al., "Graph-Based Explainable AI: A Comprehensive Survey", HAL open science, HAL Id: hal-04660442, Preprint submitted on Jul. 23, 2024, retrieved from <https://hal.science/hal-04660442v1/document> on Apr. 25, 2025 (36 pages).

Sun et al., "Investigating Explainability of Generative AI for Code through Scenario-based Design", ACM Digital Library, ACM ISBN 978-1-4503-9144-3/22/03, Mar. 22, 2022, retrieved from <https://dl.acm.org/doi/fullHtml/10.1145/3490099.3511119> on Apr. 25, 2025 (28 pages).

Ye et al., "Generative AI for visualization: State of the art and future directions", Science Direct, Visual Informatics, vol. 8, Issue 2, Jun. 2024, pp. 43-66. Retrieved from <https://www.sciencedirect.com/science/article/pii/S2468502X24000160> on Apr. 25, 2025 (24 pages).

Salem et al., "Maatphor: Automated Variant Analysis for Prompt Injection Attacks", arXiv:2312.11513v1, Dec. 12, 2023, retrieved from <https://arxiv.org/abs/2312.11513> on Apr. 25, 2025 (13 pages).

Xiong et al., "Defensive Prompt Patch: A Robust and Interpretable Defense of LLMs against Jailbreak Attacks", arXiv:2405.20099v1, May 30, 2024, retrieved from <https://arxiv.org/abs/2405.20099> on Apr. 25, 2025 (27 pages).

Liu et al., "Formalizing and Benchmarking Prompt Injection Attacks and Defenses", arXiv:2310.12815v4, Nov. 24, 2024, retrieved from <https://arxiv.org/abs/2310.12815> on Apr. 25, 2025 (27 pages).

Wang et al., "Hidden You Malicious Goal Into Benign Narratives: Jailbreak Large Language Models through Logic Chain Injection", arXiv:2404.04849v2, Apr. 16, 2024, retrieved from <https://arxiv.org/abs/2404.04849> on Apr. 25, 2025 (10 pages).

Yu et al., "Assessing Prompt Injection Risks in 200+ Custom GPTS", arXiv:2311.11538v2, May 25, 2024, retrieved from <https://arxiv.org/abs/2311.11538> on Apr. 25, 2025 (10 pages).

Liu et al., "Large Language Models and Causal Inference in Collaboration: A Comprehensive Survey", arXiv:2403.09606v1, Mar. 14, 2024, retrieved from <https://arxiv.org/pdf/2403.09606v1> on Apr. 25, 2025 (19 pages).

Ji et al., "LLM Internal States Reveal Hallucination Risk Faced With a Query", arXiv:2407.03282v1, Jul. 3, 2024, retrieved from <https://arxiv.org/pdf/2407.03282v1> on Apr. 25, 2025 (17 pages).

Wang et al., "M-RAG: Reinforcing Large Language Model Performance through Retrieval-Augmented Generation with Multiple Partitions", arXiv:2405.16420v1, May 26, 2024, retrieved from <https://arxiv.org/pdf/2405.16420v1> on Apr. 25, 2025 (13 pages).

Chan et al., "RQ-RAG: Learning To Refine Queries for Retrieval Augmented Generation", arXiv:2404.00610v1, Mar. 31, 2024, retrieved from <https://arxiv.org/pdf/2404.00610v1> on Apr. 25, 2025 (18 pages).

Yang et al., "The Geometry of Queries: Query-Based Innovations in Retrieval-Augmented Generation", arXiv:2407.18044v1, Jul. 25, 2024, retrieved from <https://arxiv.org/pdf/2407.18044v1> on Apr. 25, 2025 (22 pages).

Ganesh et al., "Context-augmented Retrieval: A Novel Framework for Fast Information Retrieval based Response Generation using Large Language Model", arXiv:2406.16383v1, Jun. 24, 2024, retrieved from <https://arxiv.org/pdf/2406.16383v1> on Apr. 25, 2025 (5 pages).

Wang et al., "RichRAG: Crafting Rich Responses for Multi-faceted Queries in Retrieval-Augmented Generation", arXiv:2406.12566v3, retrieved from <https://arxiv.org/pdf/2406.12566> on Apr. 25, 2025 (17 pages).

He et al., "Retrieving, Rethinking and Revising: The Chain-of-Verification Can Improve Retrieval Augmented Generation", arXiv:2410.05801v1, Oct. 8, 2024, retrieved from <https://arxiv.org/abs/2410.05801> on Apr. 25, 2025 (23 pages).

* cited by examiner

Prompt 200

"My computer is not working. It keeps re-starting and overheating. I have computer A and I use operating system B, monitor C, keyboard D, and mouse E. How do I fix it?

Graphical Representation 225

Modified Prompt 212

"My computer is not working. It keeps re-starting and overheating. I have computer A, and I use monitor C, keyboard D, and mouse E. How do I fix it?

Graphical Representation 215

Operating System B 236

Re-starting 231

Not Working 235

Overheating 233

Computer A 228

Mouse E 234

Edge 226

Monitor C 230

Keyboard D 232

Output 208

"We recommend re-installing driver F and disconnecting and re-connecting and re-connecting all Bluetooth devices."

Graphical Representation 238

Re-Install
237

Edge
241

Driver F
240

Disconnect
and Re-
Connect
239

Bluetooth
Devices
241

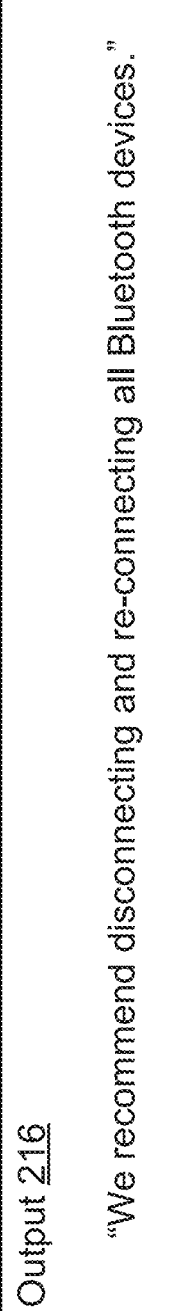
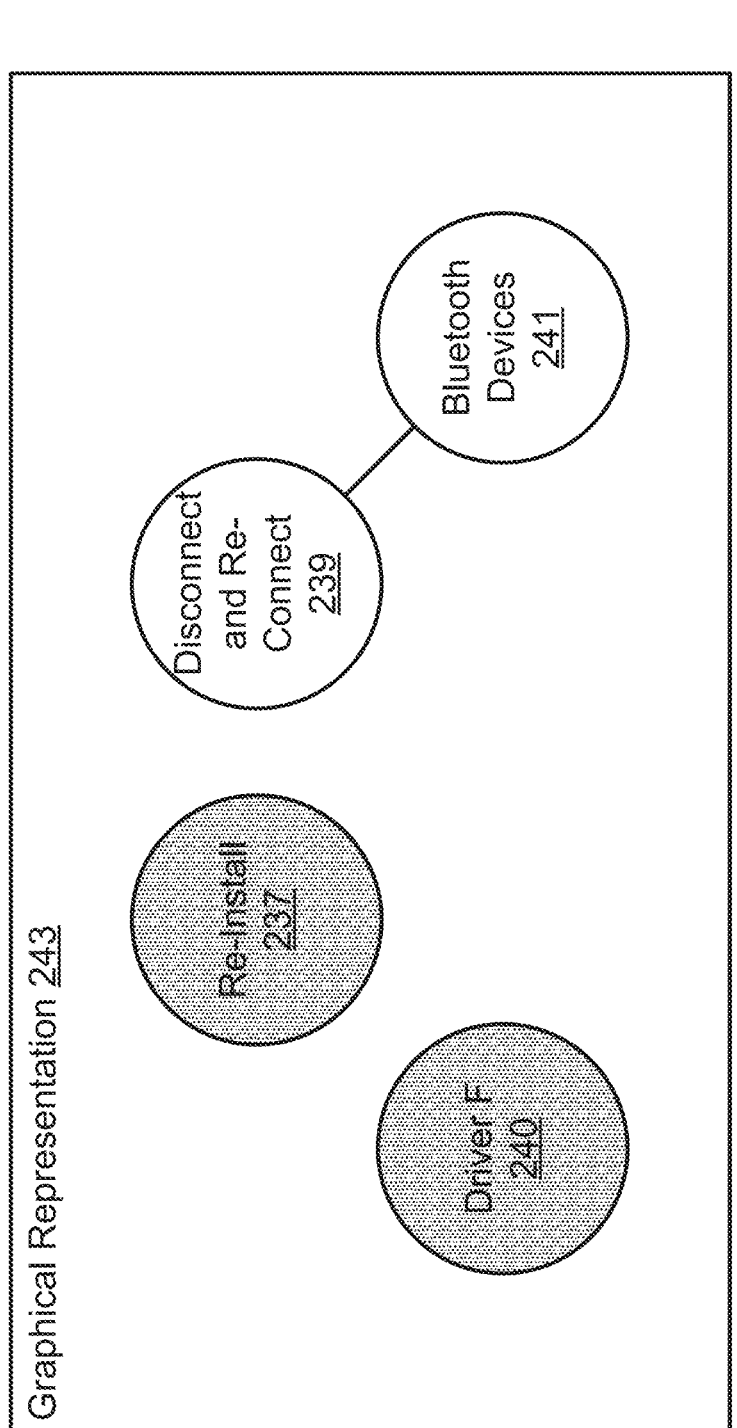
Output 216
"We recommend disconnecting and re-connecting all Bluetooth devices."
Graphical Representation 243
Re-Install 237
Driver F 240
Disconnect and Re-Connect 239
Bluetooth Devices 241
FIG. 2G Graphical User Interface (GUI) 251

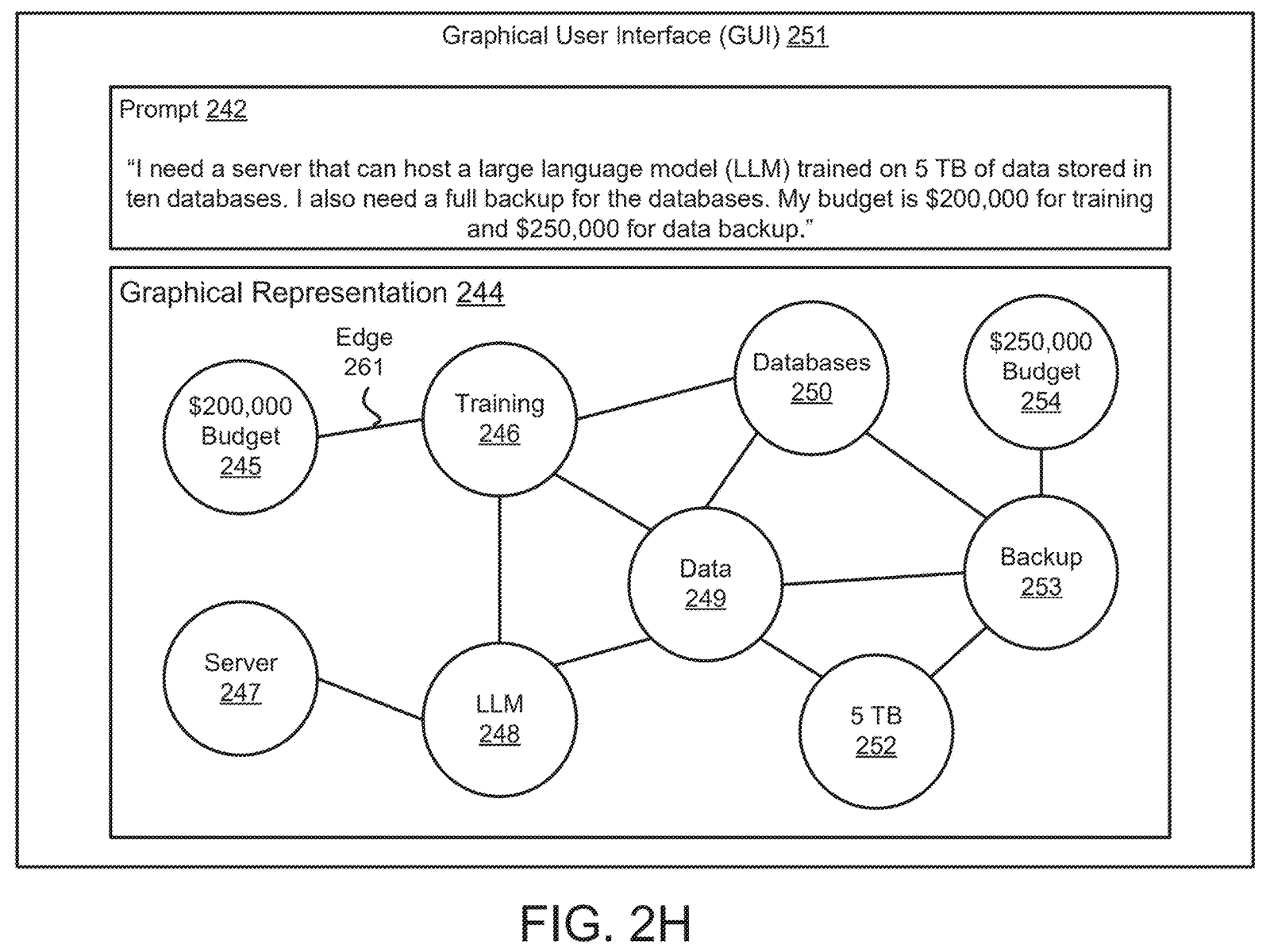

Prompt 242

"I need a server that can host a large language model (LLM) trained on 5 TB of data stored in ten databases. I also need a full backup for the databases. My budget is $200,000 for training and $250,000 for data backup."

Graphical Representation 244

$250,000 Budget 254

Backup 253

5 TB 252

Databases 250

Data 249

Training 246

LLM 248

Edge 261

$200,000 Budget 245

Server 247

FIG. 2H

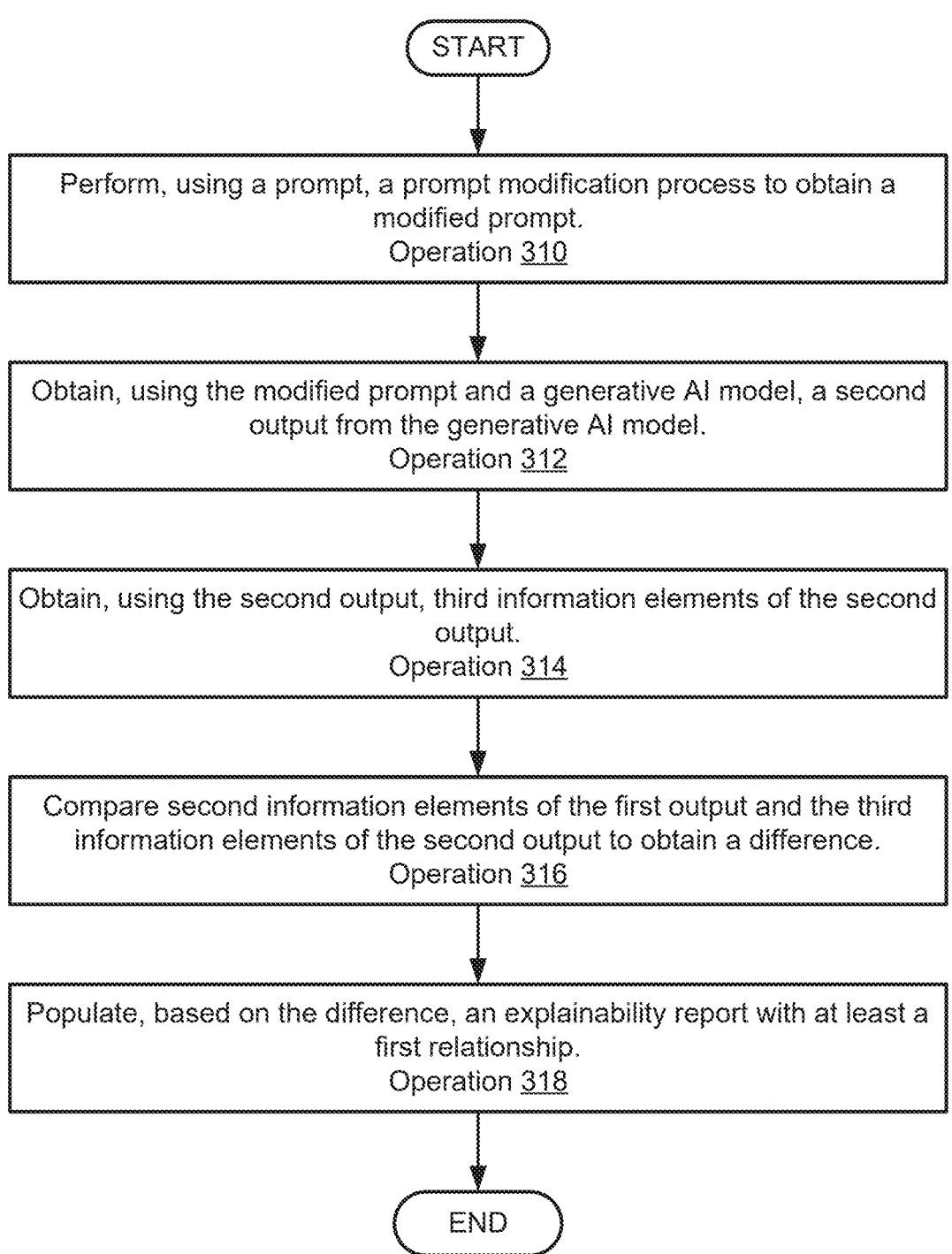

START

Perform, using a prompt, a prompt modification process to obtain a
modified prompt.
Operation 310

Obtain, using the modified prompt and a generative AI model, a second
output from the generative AI model.
Operation 312

Obtain, using the second output, third information elements of the second
output.
Operation 314

Compare second information elements of the first output and the third
information elements of the second output to obtain a difference.
Operation 316

Populate, based on the difference, an explainability report with at least a
first relationship.
Operation 318

END

FIG. 3B

MANAGING GENERATIVE ARTIFICIAL INTELLIGENCE (AI) MODEL OUTPUTS USING EXPLAINABILITY REPORTS

FIELD

Embodiments disclosed herein relate generally to providing computer-implemented services using generative artificial intelligence (AI) models. More particularly, embodiments disclosed herein relate to managing generative AI model outputs using explainability reports.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2C-2I show examples of data used to perform portions of output explainability processes in accordance with an embodiment.

FIGS. 3A-3B show flow diagrams illustrating a method for providing computer-implemented services using generative AI models in accordance with an embodiment.

DETAILED DESCRIPTION

Figure 1:
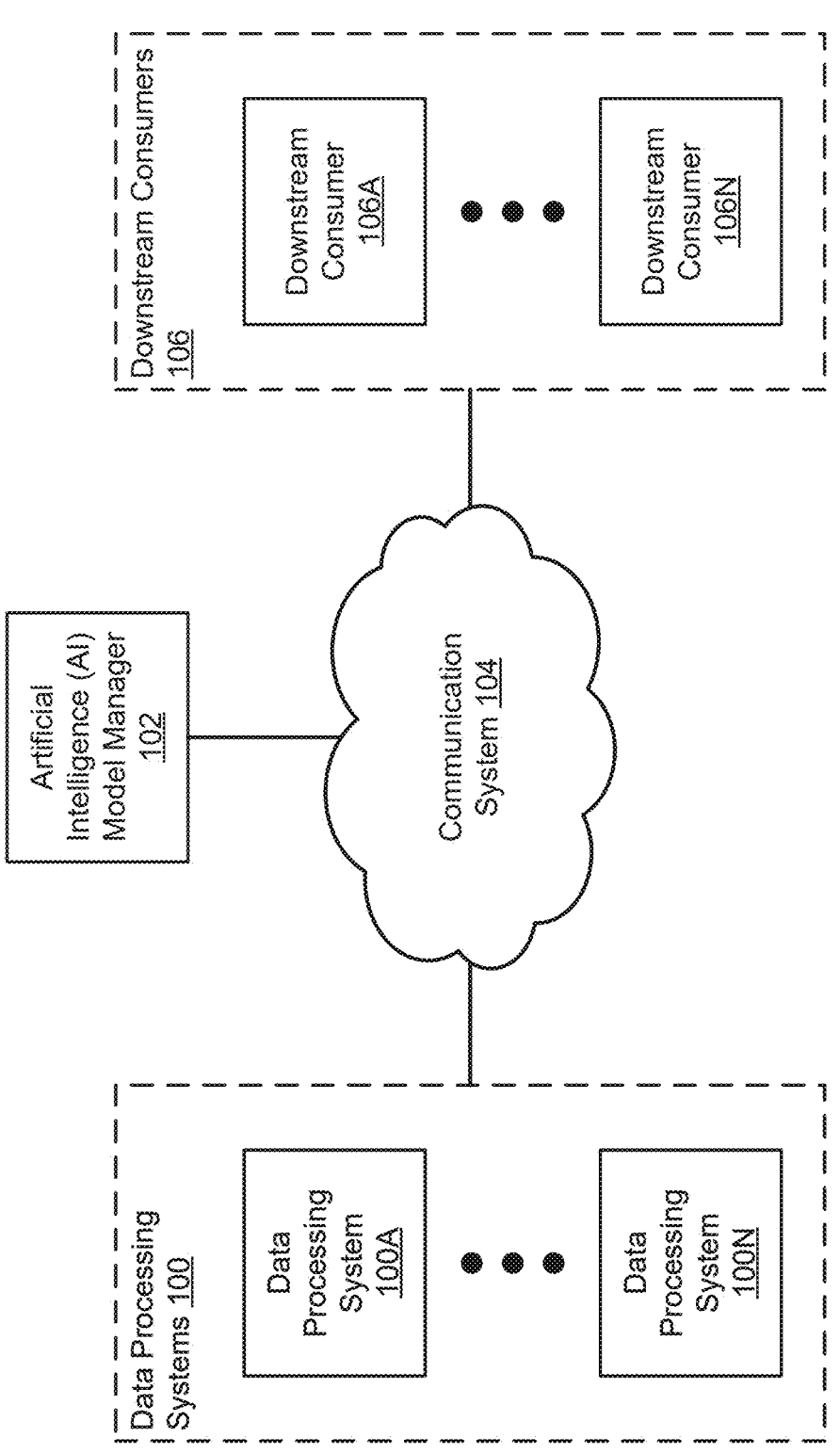
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer-implemented services using generative AI models. The generative AI models may include large language models (LLMs) that may generate outputs when provided with prompts. The outputs may be used, at least in part, to provide the computer-implemented services. For example, the outputs may be provided to a downstream consumer and the downstream consumer may use the outputs to make decisions.

However, a usefulness of the outputs to the downstream consumer may be reduced if the downstream consumer does not understand why an output was generated. For example, a downstream consumer (e.g., a client, a customer) may desire to use an output to manage a computer system. However, if the LLM does not operate as expected (e.g., due to data drift in training data and/or production data, due to bias in the training data and/or production data), the output may negatively impact the computer system. In addition, the computer system managed by the client may store private medical information, private financial information, and/or other data protected by various regulatory standards (e.g., general data protection regulation (GDPR), health insurance portability and accountability act (HIPPA)). The client may choose not to utilize the output generated by the LLM if the client is unable to determine whether the output generation process complies with one or more regulatory standards.

To increase a likelihood of outputs generated by generative AI models meeting expectations of downstream consumers, explainability reports for outputs may be provided along with the outputs to downstream consumers. Explainability reports may provide downstream consumers with insight into a generative AI model's decision making processes and may allow the downstream consumer to make adjustments to the prompt to alter a particular portion of the output.

To generate an explainability report, a generative AI model may generate a first output when provided with a prompt. The prompt, the first output, and the generative AI model may be used to perform an output explainability process to obtain an explainability report. The explainability report may indicate relationships between first information elements (e.g., items included in the prompt) and second information elements (e.g., items included in the first output).

Performing the output explainability process may include: (i) iteratively perturbating information content of the prompt to obtain perturbated prompts, (ii) evaluating the perturbated prompts using the generative AI model to obtain perturbated outputs, (iii) using the perturbated prompts and perturbated outputs to identify the relationships between the first information elements and the second information elements, and/ or (iv) other methods.

Thus, embodiments disclosed herein may provide an improved method for providing computer-implemented services using generative AI models. To provide the computer-implemented services as desired by downstream consumers, an explainability report may be provided to the downstream consumers along with an output generated by the generative AI model. The explainability report may explain how the output was generated thereby increasing a usefulness of the output to the downstream consumer.

In an embodiment, a method for providing computer-implemented services using generative AI models is provided. The method may include: obtaining a prompt for a generative AI model of the generative AI models; obtaining, using the prompt and the generative AI model, a first output from the generative AI model; performing, using at least the prompt, the first output, and the generative AI model, an output explainability process to obtain an explainability report for the first output, the explainability report indicating relationships between first information elements of the prompt and second information elements of the first output, and the relationships may be based, at least in part, on a second output generated by the generative AI model using a modified prompt and the modified prompt being based on the prompt; and providing the first output and the explainability report to a downstream consumer as part of providing computer-implemented services to the downstream consumer.

Performing the output explainability process may include: performing, using the prompt, a prompt modification process to obtain the modified prompt; obtaining, using the modified prompt and the generative AI model, the second output from the generative AI model; obtaining, using the second output, third information elements of the second output; comparing the second information elements of the first output and the third information elements of the second output to obtain a difference; and populating, based on the difference, the explainability report with at least a first relationship of the relationships.

Performing the prompt modification process may include: obtaining, using the prompt and the first output, the first information elements and the second information elements; and performing at least one action selected from a list of actions consisting of: removing a first information element of the first information elements to obtain the modified prompt; and replacing the first information element with a replacement information element to obtain the modified prompt.

Performing the prompt modification process may also include: in an instance of the performing where the at least one action includes replacing the first information element: prior to replacing the first information element: obtaining, based on the first information element and an information element replacement schema, the replacement information element.

Performing the prompt modification process may also include: in an instance of the performing where the at least one action comprises replacing the first information element: prior to replacing the first information element: displaying, via a graphical user interface (GUI), at least the first information elements to a user; and obtaining, via an interaction with the GUI, feedback from the user, the feedback including the replacement information element.

Displaying the at least the first information elements to the user may include: obtaining a first graphical representation of the first information elements, the first graphical representation including: a first set of nodes that correspond to the first information elements, and first edges that indicate relationships between the first set of the nodes; and populating the GUI with the first graphical representation.

Comparing the second information elements of the first output and the third information elements of the second output may include: obtaining a second graphical representation of the second information elements, the second graphical representation including: a second set of nodes that correspond to the second information elements, and second edges that represent relationships between the second set of the nodes; obtaining a third graphical representation of the third information elements, the third graphical representation including: a third set of nodes that correspond to the third information elements, and third edges that represent relationships between the third set of the nodes; and identifying, using the second graphical representation and the third graphical representation, one or more nodes of the second set of the nodes that is not present in the third graphical representation.

The first output may include a second information element and the second output may not include the second information element.

The second output may include a third information element and the first output may not include the third information element.

The second graphical representation and the third graphical representation may be displayed to the user via the GUI.

Performing the output explainability process may include: iteratively perturbating information content of the prompt to obtain perturbated prompts; evaluating the perturbated prompts using the generative AI model to obtain perturbated outputs; and using the perturbated prompts and the perturbated outputs to identify the relationships between the first information elements and the second information elements.

The generative AI model may be a large language model (LLM).

In an embodiment, a non-transitory media is provided. The non-transitory media may include instructions that when executed by a processor cause the computer-implemented method to be performed.

In an embodiment, a system is provided. The system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide for management of data processing systems that may provide, at least in part, computer-implemented services (e.g., to users of the system and/or devices operably connected to the system).

The computer-implemented services may include any type and quantity of computer-implemented services. The computer-implemented services may include, for example, database services, data processing services, electronic communication services, inference generation services, and/or any other services that may be provided using one or more computing devices. The computer-implemented services may be provided by, for example, data processing systems 100, AI model manager 102, downstream consumers 106, and/or any other type of devices (not shown in FIG. 1). Other types of computer-implemented services may be provided by the system shown in FIG. 1 without departing from embodiments disclosed herein.

The computer-implemented services may be provided, at least in part, using generative AI models and/or outputs obtained using the generative AI models. To do so, data processing systems 100 and/or AI model manager 102 may host any number of generative AI models.

To obtain the outputs, the generative AI models may be trained, using training data, to generate the outputs when provided with prompts (e.g., ingest data). The generative AI models may include large language models (LLMs) and, therefore, the outputs may include new instances of data created by the generative AI models based on learned associations from and/or an understanding of the training data. For example, the generative AI models may be trained using unstructured data, such as stories, essays, audio transcription, video description, and/or other types of human interpretable text, to generate outputs of the same. The outputs may be provided to downstream consumers 106 (e.g., client devices, data processing systems that manage computer systems and/or production systems) as part of providing the computer-implemented services.

However, the outputs may be provided to downstream consumers 106 as part of: (i) customer service requests (e.g., troubleshooting computer systems), (ii) data management processes (e.g., healthcare data, financial data), (iii) production system management processes (e.g., industrial applications), and/or (iv) other processes. The outputs, therefore, may be desired (e.g., by downstream consumers 106) to meet certain expectations. For example, downstream consumers 106 may expect the generative AI model and the outputs to comply with data privacy regulations (e.g., GDPR, HIPPA), may desire to mitigate unintended bias in outputs (e.g., when using the responses to make decisions based on financial data of consumers), and/or may otherwise wish to understand, audit, and/or modify operation of the generative AI models. If downstream consumers 106 are unable to determine whether the generative AI models and/or the outputs meet their expectations, a usefulness of the outputs to downstream consumers 106 may be reduced.

In general, embodiments disclosed herein may provide methods, systems, and/or devices for providing explainability reports to downstream consumers along with the outputs generated by the generative AI models. The explainability reports may describe (e.g., in human-interpretable text) why the generative AI model generated an output (e.g., may indicate relationships between portions of the prompt and portions of the output).

To do so, a prompt for a generative AI model may be obtained and used to obtain a first output from the generative AI model. To obtain the explainability report for the first output, an output explainability process may be performed using at least the prompt, the first output, and the generative AI model. The explainability report may be provided along with the first output to a downstream consumer (e.g., 106A) as part of providing computer-implemented services to the downstream consumer.

Performing the output explainability process may include: (i) iteratively perturbating information content of the prompt to obtain perturbated prompts, (ii) evaluating the perturbated prompts using the generative AI model to obtain perturbated outputs, (iii) using the perturbated prompts and the perturbated outputs to identify at least the relationships between the portions of the prompt and the portions of the first output, and/or (iv) other methods.

Figure 2A:
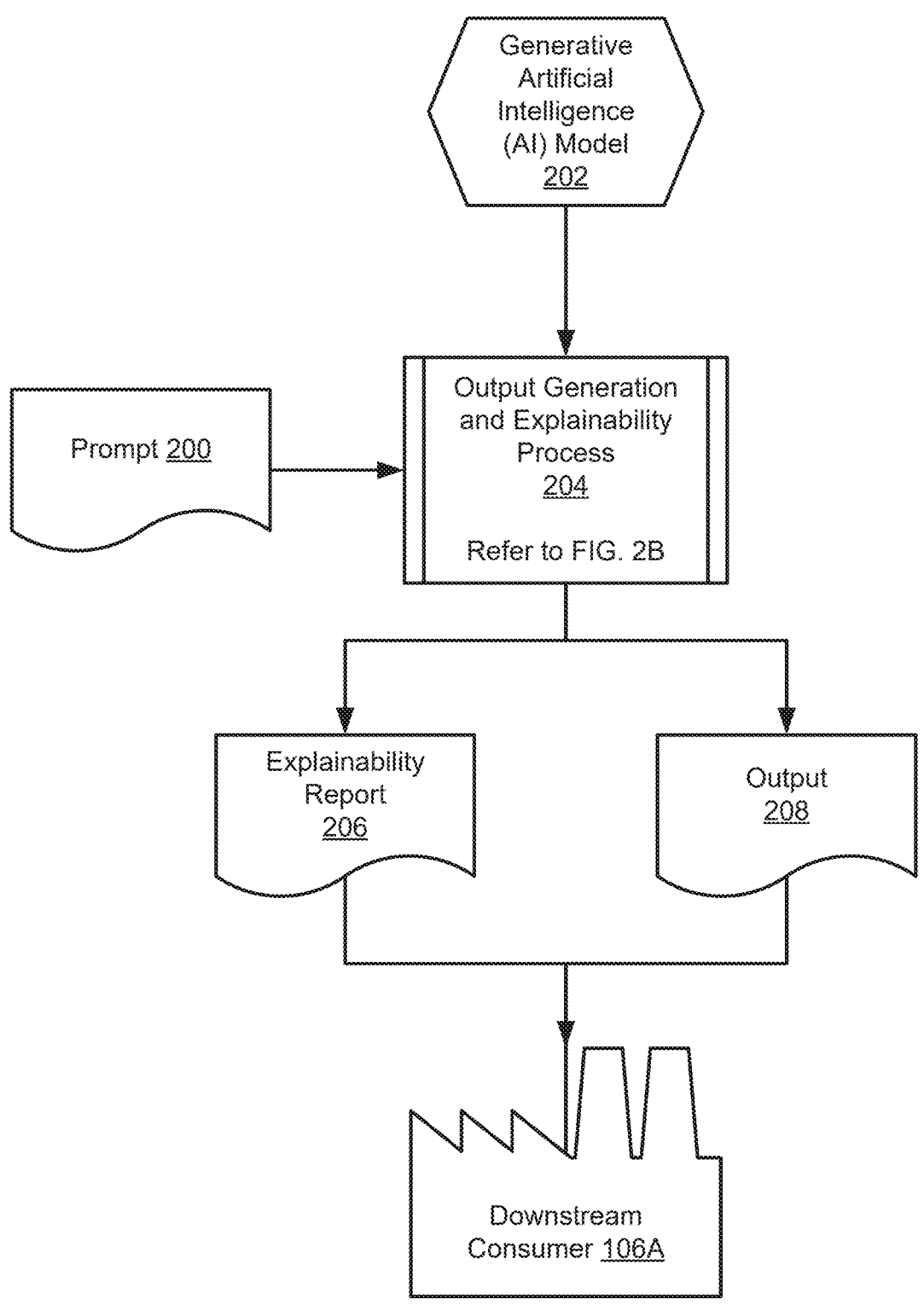
FIGS. 2A-2B show flow diagrams illustrating data flows in accordance with an embodiment.
Figure 2B:
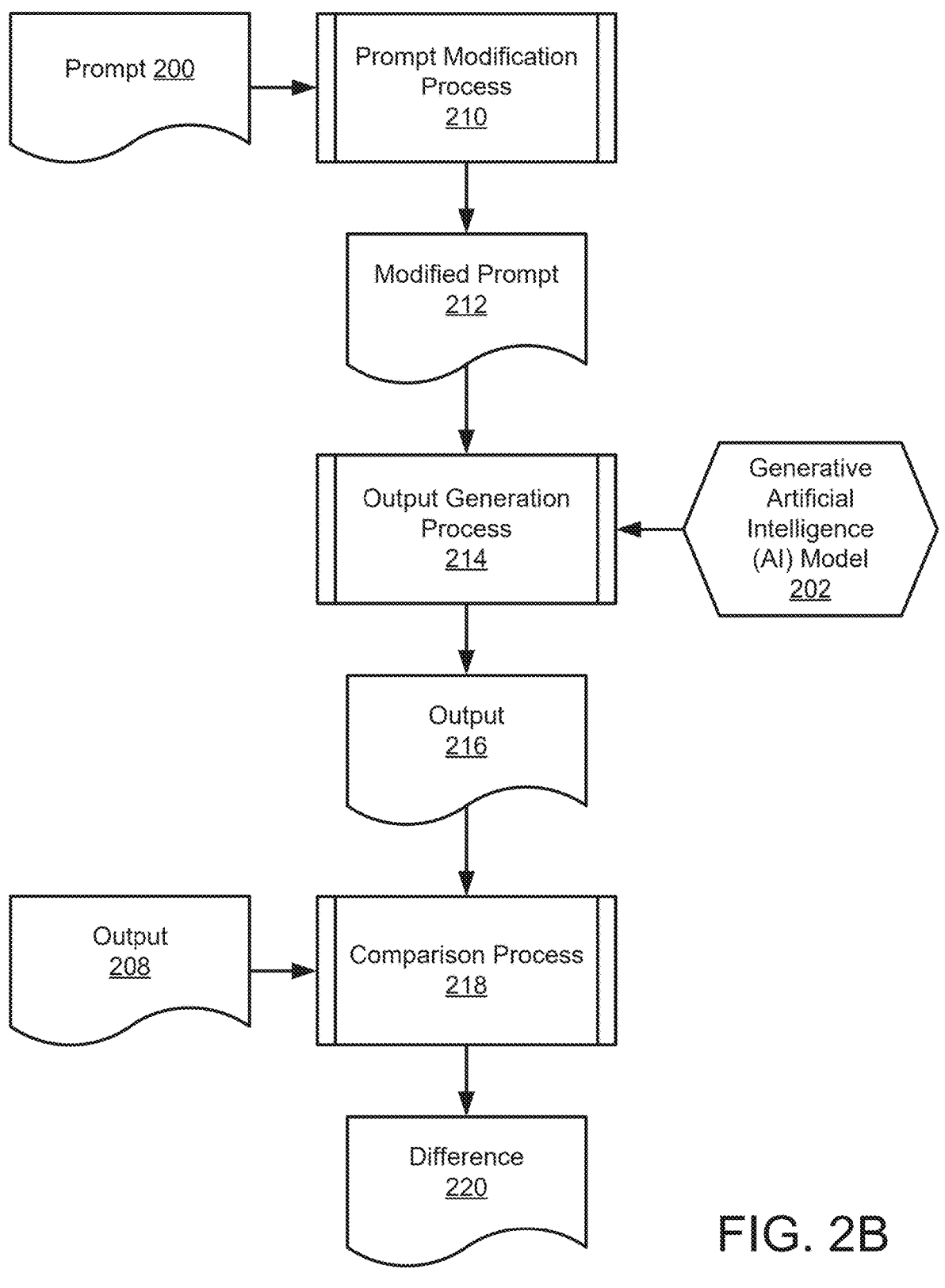

For example, a prompt modification process may be performed to perturbate information content of the prompt to obtain a perturbated prompt (e.g., removing a first portion of the prompt, replacing a first portion of the prompt with other data). Refer to FIGS. 2A-2B for additional details regarding modifying the prompt. The perturbated (e.g., modified) prompt may be used to obtain a second output from the generative AI model.

The second output may be compared to the first output to obtain a difference. The difference may be used to generate a first relationship (e.g., between a portion of the prompt and a portion of the first output) and the first relationship may be added to the explainability report. Any number of additional relationships may be added to the explainability report following other instances of perturbation of the prompt.

Thus, embodiments disclosed herein may improve processes of explaining outputs generated by generative AI models to downstream consumers of the outputs. By iteratively perturbating prompts and comparing outputs generated using the perturbated prompts, portions of the output may be associated with portions of the prompt so that transparency of decision-making by the generative AI model to the downstream consumers may be increased.

To provide the above noted functionality, the system of FIG. 1 may include data processing systems 100, AI model manager 102, downstream consumers 106, and communication system 104. Each of these components is discussed below.

Data processing systems 100 may provide all, or a portion of, the computer-implemented services. Data processing systems 100 may include any number of data processing systems (e.g., 100A-100N) that may provide output generation services to downstream consumers 106. For example, a downstream consumer (e.g., 106A) may subscribe to output generation services provided by data processing system 100A and downstream consumer 106A may provide prompts (e.g., from clients, from owners of downstream consumer 106A, from employees of a company that owns downstream consumer 106A) to data processing system 100A as part of the subscribed services.

To provide computer-implemented services, data processing systems 100 may: (i) obtain prompts for generative AI models (e.g., hosted and/or operated by data processing systems 100), (ii) obtain, using the prompts and the generative AI models, outputs from the generative AI models, (iii) perform output explainability processes to obtain explainability reports for the outputs, (iv) provide the outputs and the explainability reports to downstream consumers 106 as part of providing computer-implemented services to downstream consumers 106, and/or (v) perform other actions. Refer to FIGS. 2A-2B for additional details regarding performing output explainability processes.

AI model manager 102 may manage any number of AI models. For example, AI model manager 102 may: (i) obtain training data for AI models, (ii) train any number of AI models to obtain trained AI models, (iii) deploy trained AI models to other entities (e.g., data processing systems 100), (iv) update and/or modify trained AI models (e.g., fine-tune trained AI models based on additional training and/or production data), and/or (v) provide other AI model management services.

For example, AI model manager 102 may cooperatively provide at least a portion of the computer-implemented services to data processing systems 100 by: (i) obtaining training data from downstream consumers 106, (ii) training one or more AI models (e.g., generative AI models) using at least the training data obtained from downstream consumers 106 to obtain one or more trained AI models, (iii) deploying the one or more trained AI models to data processing systems 100 for use in providing output generation services for downstream consumers 106, and/or (iv) performing other actions.

Downstream consumers 106 may provide and/or consume all, or a portion of, the computer-implemented services. Downstream consumers 106 may include any number of downstream consumers (e.g., 106A-106N) and may include, for example, businesses, individuals, and/or devices (e.g., data processing systems) that may obtain outputs and/or other information based on the outputs (e.g., explainability reports) as part of receiving the computer-implemented services.

When providing their functionality, any of (and/or components thereof) data processing systems 100, AI model manager 102, and/or downstream consumers 106 may perform all, or a portion, of the actions and methods illustrated in FIGS. 2A-3B.

Any of (and/or components thereof) data processing systems 100, AI model manager 102, and downstream consumers 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

Communication system 104 may allow any of data processing systems 100, AI model manager 102, and downstream consumers 106 to communicate with one another (and/or with other devices not illustrated in FIG. 1). To provide its functionality, communication system 104 may be implemented with one or more wired and/or wireless networks. Any of these networks may be a radio access network (e.g., a cellular core network), a private network (e.g., the "Network" shown in FIG. 4), a public network, and/or may include the Internet. For example, data processing systems 100 may be operably connected to AI model manager 102 and downstream consumers 106 via the Internet. Data processing systems 100, AI model manager 102, downstream consumers 106, and/or communication system 104 may be adapted to perform one or more protocols for communicating via communication system 104.

While illustrated in FIG. 1 as including a limited number of specific components, a system in accordance with an embodiment may include fewer, additional, and/or different components than those illustrated therein.

While providing their functionality, any of data processing systems 100, AI model manager 102, and/or downstream consumers 106 may provide all or a portion of the methods shown in FIGS. 2A-3B.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 206, etc.) is used to represent data structures, a second set of shapes (e.g., 204, 210 etc.) is used to represent processes performed using and/or that generate data, a third set of shapes (e.g., 202) is used to represent generative AI models and/or other types of models, and a fourth set of shapes (e.g., 106A) is used to represent downstream consumers.

Turning to FIG. 2A, a first data flow diagram in accordance with an embodiment is shown. The first data flow diagram may illustrate data used in and data processing performed in obtaining a generative AI model output and an explainability report for the output.

To obtain the output and the explainability report for the output, output generation and explainability process 204 may be performed. During output generation and explainability process 204: (i) prompt 200 and generative AI model 202 may be used to generate output 208 and (ii) at least prompt 200, generative AI model 202, and output 208 may be used to generate explainability report 206.

For example, generative AI model 202 may be an LLM (e.g., a neural network inference model) trained to generate language, understand language, and/or otherwise process requests related to languages. Generative AI model 202 may have been previously trained using training data and any training process (e.g., a global optimization process using gradient descent), the training data indicating goals for outputs generated by generative AI model 202 (e.g., outputs). Parameters of generative AI model 202 may be selected using an optimization process (e.g., an objective function may be defined in terms of the training data and outputs generated by generative AI model 202, and a global optimization method such as gradient descent may be used to identify parameters that most faithfully reproduce the trends in the training data). Once the parameters of generative AI model 202 are set, then generative AI model 202 may be used to generate outputs (e.g., responses) based on input data (e.g., prompts). Generative AI model 202 may be trained using other methods without departing from embodiments disclosed herein.

Figure 2C:
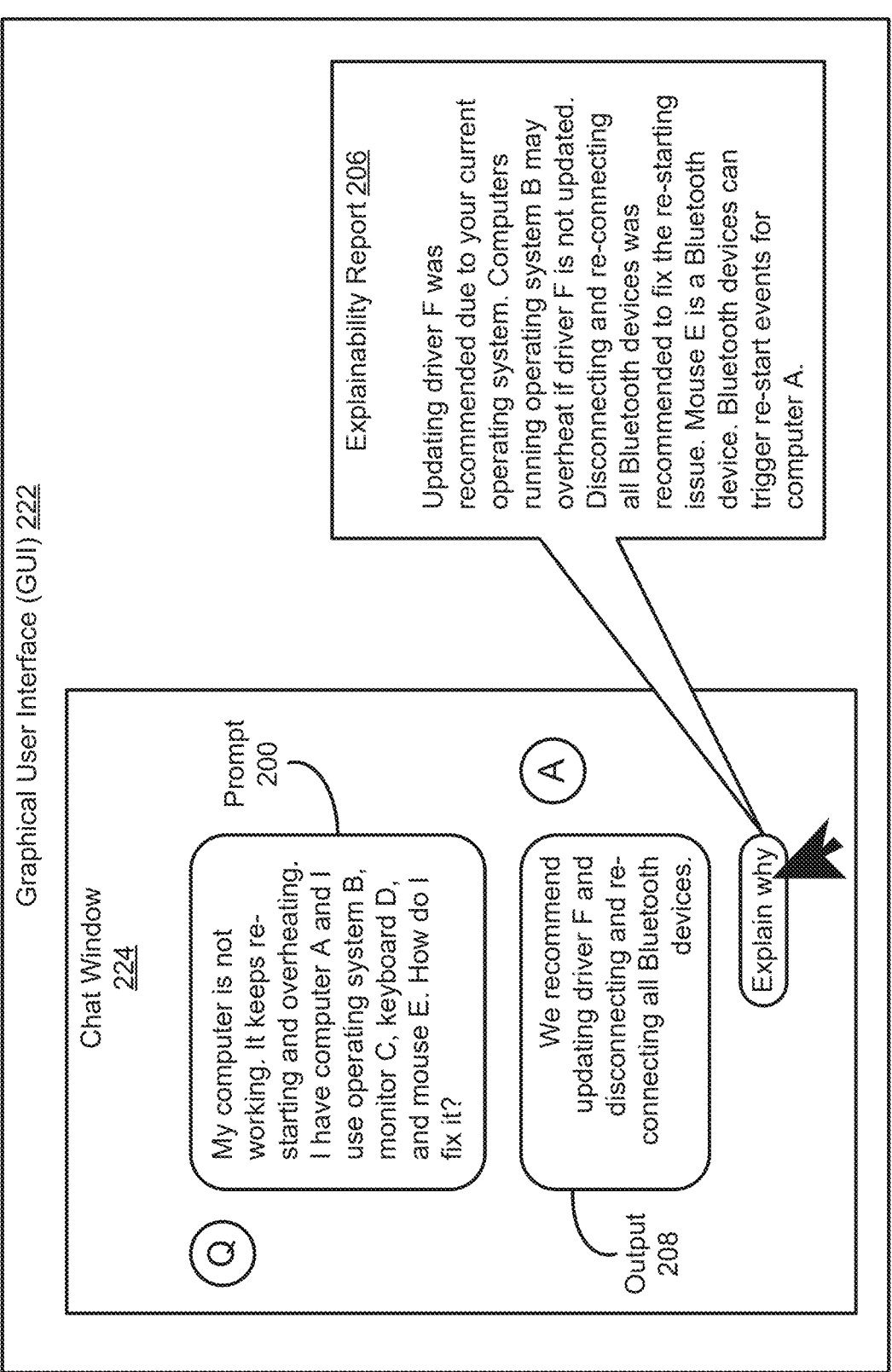

Prompt 200 may be intended to elicit an output from a generative AI model that includes information content desired by downstream consumer 106A (e.g., prompt 200 may be obtained from downstream consumer 106A). Prompt 200, for example, may include human-interpretable text and may include a question. For example, prompt 200 may include: (i) a request from a user for help assessing a malfunction of a computer system, (ii) a request from a customer for a product recommendation, (iii) a request from an employee of a business for a recommendation regarding a financial product (e.g., whether to extend a line of credit to a customer), and/or (iv) other requests. Refer to FIG. 2C for an example of prompt 200.

To generate output 208, prompt 200 may be provided to generative AI model 202 (e.g., prompt 200 may be fed into generative AI model 202 as ingest). Output 208 may be responsive to prompt 200. For example, output 208 may include human-interpretable text that indicates: (i) instructions for troubleshooting a malfunction of a computer system, (ii) a product recommendation, (iii) a financial product recommendation, and/or (iv) other information.

During output generation and explainability process 204, prompt 200, generative AI model 202, and output 208 may be used to obtain explainability report 206. Explainability report 206 may include human-interpretable text indicating relationships between information content of prompt 200 and information content of output 208. Explainability report 206 may be intended to explain, to downstream consumer 106A, why generative AI model 202 generated the information content of output 208 (e.g., why various decisions were made).

Explainability report 206 may be obtained by: (i) iteratively perturbating (e.g., modifying) information content of prompt 200 to obtain perturbated (e.g., modified) prompts, (ii) evaluating the perturbated prompts using generative AI model 202 to obtain perturbated outputs, (iii) using the perturbated prompts and the perturbated outputs to identify relationships between information elements of prompt 200 and information content of the perturbated outputs, and/or (iv) performing other actions. Refer to FIG. 2B for additional details regarding obtaining explainability report 206. Refer to FIG. 2C for an example graphical representation of prompt 200.

Output 208 and explainability report 206 may be provided to downstream consumer 106A as part of a computer-implemented service (e.g., via a chat interface). Downstream consumer 106A may subsequently use the output to make decisions.

Turning to FIG. 2B, a second data flow diagram in accordance with an embodiment is shown. The second data flow diagram may illustrate data used in and data processing performed during at least a partial expansion of output generation and explainability process 204 described in FIG. 2A. Explainability report 206 (e.g., described in FIG. 2A) may indicate relationships between first information elements of prompt 200 and second information elements of output 208. FIG. 2B may illustrate processes performed to obtain a first relationship of the relationships.

To generate the first relationship, prompt modification process 210 may be performed. During prompt modification process 210, a first information element of prompt 200 may be modified (e.g., removed, replaced with a replacement information element) to obtain modified prompt 212. The first information element may be selected based on: (i) a policy, (ii) an information element replacement schema, (iii) user feedback (e.g., a client may select the information element via a GUI), and/or (iv) via other methods.

The first information elements of prompt 200 may include any item, object, or entity in prompt 200 and the information elements may be identified via any algorithm, machine learning model, and/or rule set for natural language processing to extract information from text. Information elements may be extracted from other types of data modalities (e.g., images, audio, video) via object recognition algorithms or models. Information elements may be obtained via other methods without departing from embodiments disclosed herein.

For example, prompt 200 may include the following text: "My computer is not working. It keeps re-starting and overheating. I have computer A and I use operating system B, monitor C, keyboard D, and mouse E. How do I fix it?" The first information elements extracted from prompt 200 may, therefore, include: (i) computer A, (ii) operating system B, (iii) monitor C, (iv) keyboard D, and (v) mouse E.

Figure 2D:
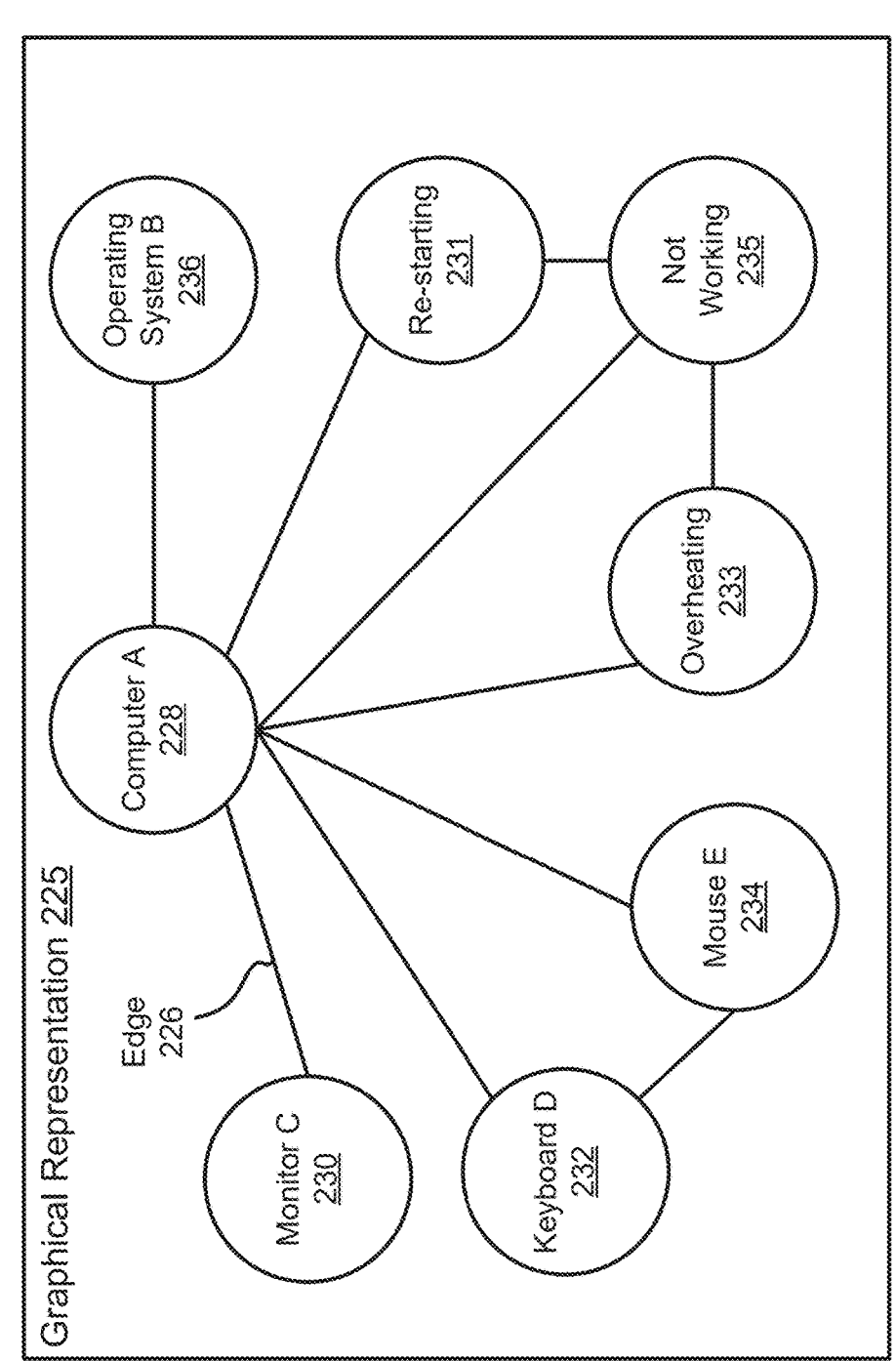

The first information elements may be stored as a list, as a graphical representation of the first information elements, as human-interpretable text that summarizes the first information elements, and/or in other formats. Refer to FIG. 2D for an example graphical representation of prompt 200. The first information elements (e.g., the human-interpretable text, the graphical representation, the list) may be published to a client portal and may be accessible by a downstream consumer via a graphical user interface (GUI).

Continuing with the above example, information elements of prompt 200 may be iteratively removed (e.g., one information element may be removed at a time) to generate any number of modified prompts. Modified prompt 212 may be one of the modified prompts generated by removing a first information element of the first information elements (e.g., operating system B).

Prompt 200 may also be modified, for example, by replacing the first information element with a replacement information element (e.g., provided by a user via a GUI, obtained using a retrieval augmented generation (RAG) process and any number of data sources) to obtain modified prompt 212. Refer to FIGS. 2C-2G for an example of removing an information element from a prompt. Refer to FIGS. 2H-2I for an example of replacing an information element with one or more replacement information elements.

Modified prompt 212 and generative AI model 202 may be used to perform output generation process 214. During output generation process 214, modified prompt 212 may be provided as ingest to generative AI model 202 and output 216 may be obtained as an output from generative AI model 202.

Output 216 and output 208 (e.g., described in FIG. 2A) may be used to perform comparison process 218. During comparison process 218, second information elements of output 208 may be compared to third information elements of output 216. To do so, the second information elements and the third information elements may be obtained using natural language processing and/or other algorithms for data extraction from text. Lists, human-interpretable text summaries, and/or graphical representations may be generated and published to a client portal (e.g., accessible by downstream consumers via a GUI).

Difference 220 may be obtained via any data comparison tool, algorithm, and/or model trained to compare text and/or graphs. For example, a set of the second information elements (e.g., displayed as human-interpretable text, displayed as a graphical representation) may be compared to a set of the third information elements (e.g., displayed as human-interpretable text, displayed as a graphical representation) to identify any of the second information elements that do not appear in the list of the third information elements. In addition, a second graphical representation of the second information elements may include any number of second nodes and a third graphical representation of the third information elements may also include any number of third nodes. During comparison process 218, the second nodes may be compared to the third nodes to identify any of the second nodes that do not appear in the third graphical representation.

One or more of the third nodes may also not appear in the second graphical representation (e.g., removal and/or replacement of a portion of the prompt may result in new information elements appearing in output 216 that did not appear in output 208).

Difference 220, therefore, may be used to establish a first relationship of the relationships included in explainability report 206 (e.g., described in FIG. 2A). The first relationship may indicate a correlation between the first information element (e.g., the portion of the prompt that was removed and/or replaced during prompt modification process 210) and difference 220 (e.g., the portion of output 216 that differs from output 208).

The processes described in FIG. 2B may be repeated any number of times (e.g., each node of a graphical representation of prompt 200 may be removed one at a time) and any number of relationships may, therefore, be generated and added to explainability report 206.

Thus, by implementing the data flow shown in FIG. 2A-2B, a system in accordance with embodiments disclosed herein may be used to generate outputs from generative AI models based on prompts and explainability reports for the outputs. By iteratively modifying prompts and obtaining modified outputs for each modified prompt, the modified outputs may be compared to extract relationships between information elements of the prompt and information elements of the output. Consequently, the relationships may be included in the explainability report and the explainability report may be used to understand why the output was generated by the generative AI model thereby increasing a reliability and/or usefulness of the output to the downstream consumer.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 2C, an example of prompt 200, output 208, and explainability report 206 are shown (e.g., described in FIG. 2A). A customer (e.g., downstream consumer 106A described in FIG. 2A) may access graphical user interface (GUI) 222 through which the customer may receive assistance troubleshooting hardware components purchased from a vendor and/or manufacturer of the hardware components. A customer may open chat window 224 as part of functionality of GUI 222 and may enter prompt 200 into the chat window. Prompt 200 may include the following text: "My computer is not working. It keeps re-starting and overheating. I have computer A and I use operating system B, monitor C, keyboard D, and mouse E. How do I fix it?" Prompt 200 is shown next to a circle with the letter "Q" inside the circle to indicate a question from the customer that was submitted via chat window 224.

Output 208 may include the following text: "We recommend updating driver F and disconnecting and re-connecting all Bluetooth devices." Output 208 is shown next to a circle with the letter "A" inside the circle to indicate an answer from the manufacturer/vendor for the hardware component (e.g., via the generative AI model).

Output 208 may be visible to the customer via chat window 224. However, the customer may wish to understand why the two steps (e.g., updating driver F and disconnecting and re-connecting all Bluetooth devices) were recommended. Therefore, the customer may utilize a human interface device (e.g., a mouse) to select the button labeled "explain why" located under output 208. By selecting the "explain why" button, explainability report 206 may be displayed as a pop-up window on GUI 222. Prompt 200, output 208, and explainability report 206 may be presented to the customer via other methods (e.g., via another GUI, via another messaging interface) without departing from embodiments disclosed herein.

Explainability report 206 may include the following text: "Updating driver F was recommended due to your current operating system. Computers running operating system B may overheat if driver F is not updated. Disconnecting and re-connecting all Bluetooth devices was recommended to fix the re-starting issue. Mouse E is a Bluetooth device. Bluetooth devices can trigger re-start events for computer A."

Turning to FIG. 2D, an example first graphical representation of prompt 200 is shown (e.g., graphical representation 225). Graphical representation 225 may be displayed to a downstream consumer (e.g., a client) via a GUI (e.g., GUI 222 described in FIG. 2C). To obtain graphical representation 225, first information elements of prompt 200 may be represented as nodes (e.g., 228-236) with edges between the nodes (e.g., edge 226) to indicate relationships between the first information elements.

For example, the information elements extracted from prompt 200 may include: (i) "computer A" shown as node 228, (ii) "monitor C" shown as node 230, (iii) "re-starting" shown as node 231, (iv) "keyboard D" shown as node 232, (v) "overheating" shown as node 233, (vi) "mouse E" shown as node 234, (vii) "not working" shown as node 235, and (viii) "operating system B" shown as node 236.

The edges between the nodes (e.g., 226) may represent relationships (e.g., data dependencies, data flows, entities that cooperatively perform workloads). For example, edge 226 may connect node 228 and node 230 to indicate that computer A receives data (e.g., input from a user) from monitor C.

Descriptive information may be embedded in the nodes as internal representations (not shown). For example, information regarding computer A (e.g., specifications, hardware components, firmware versions, software installed) may be included in an internal representation of node 228. The internal representation may be shown, for example, if a user selects node 228 via a GUI.

Graphical representation 225 may be used to iteratively modify prompt 200. For example, a schema for generating explainability reports (not shown) may indicate that a first node (e.g., 236) is to be randomly removed from graphical representation 225 to obtain modified prompt 212 (e.g., described in FIG. 2B). The other nodes (e.g., 228, 230, 231, 232, 233, 234, and 235) may be removed one at a time during other instances of prompt modifications to obtain other modified prompts.

Figure 2E:
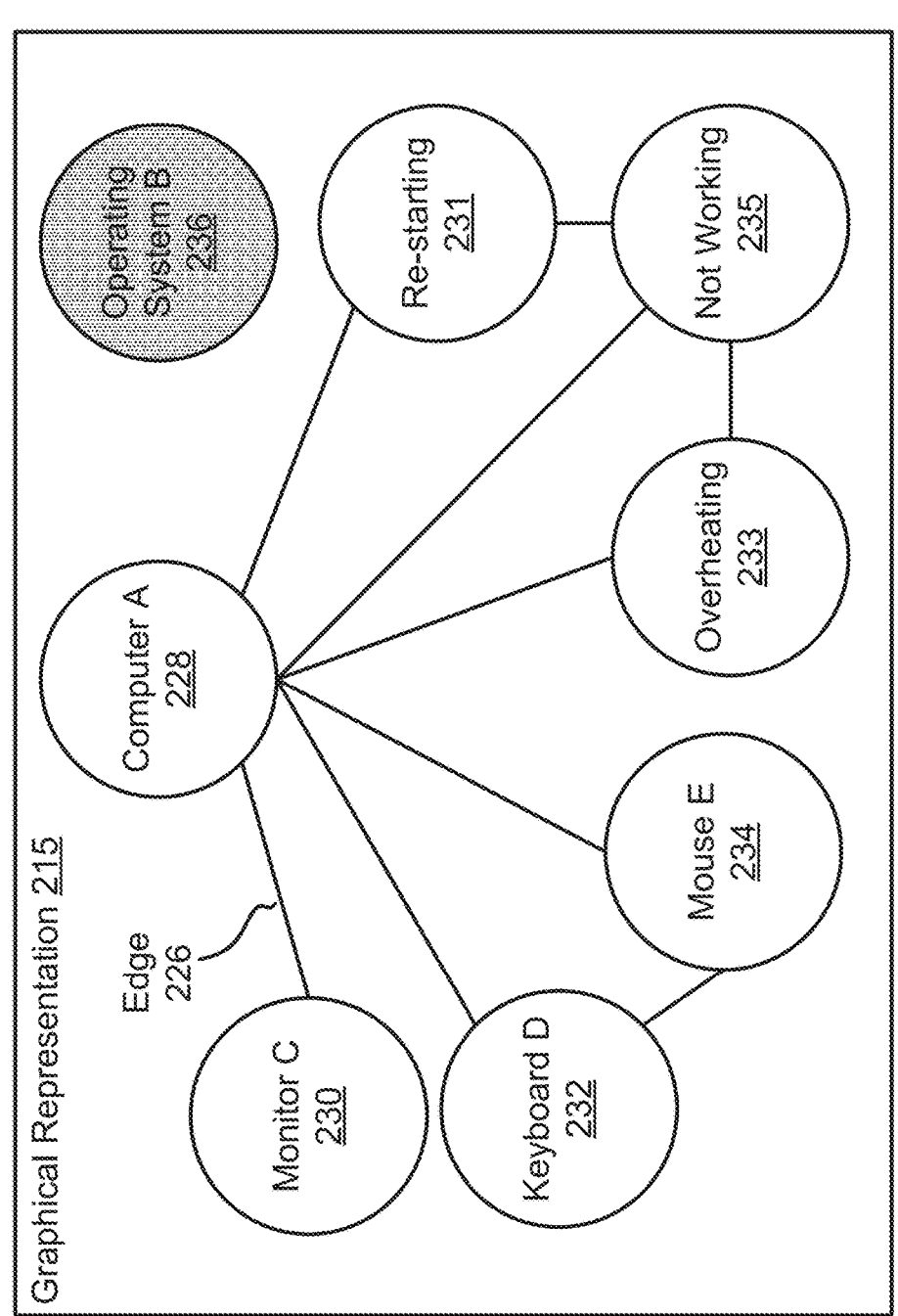

Turning to FIG. 2E, graphical representation 215 is shown. Graphical representation 215 may represent information elements of modified prompt 212. Node 236 is shown as grayed out to indicate that node 236 may be removed (e.g., randomly, according to the schema for generating explainability reports). Nodes 228, 230, 231, 232, 233, 234, and 235 may remain. Modified prompt 212 may, therefore, include the following text: "My computer is not working. It keeps re-starting and overheating. I have computer A, and I use monitor C, keyboard D, and mouse E. How do I fix it?" Consequently, the information element of "operating system B" may have been removed from prompt 200 to obtain modified prompt 212.

Figure 2F:
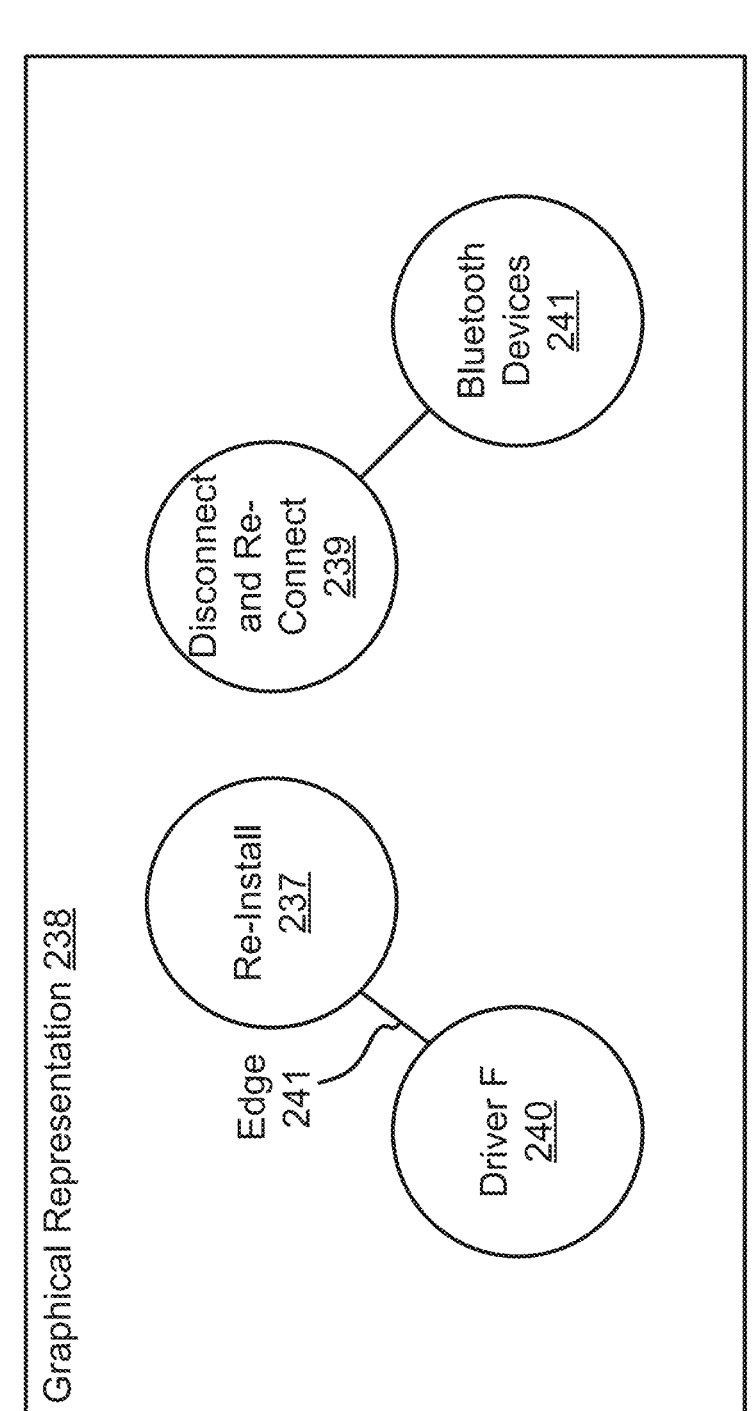
Figure 21:
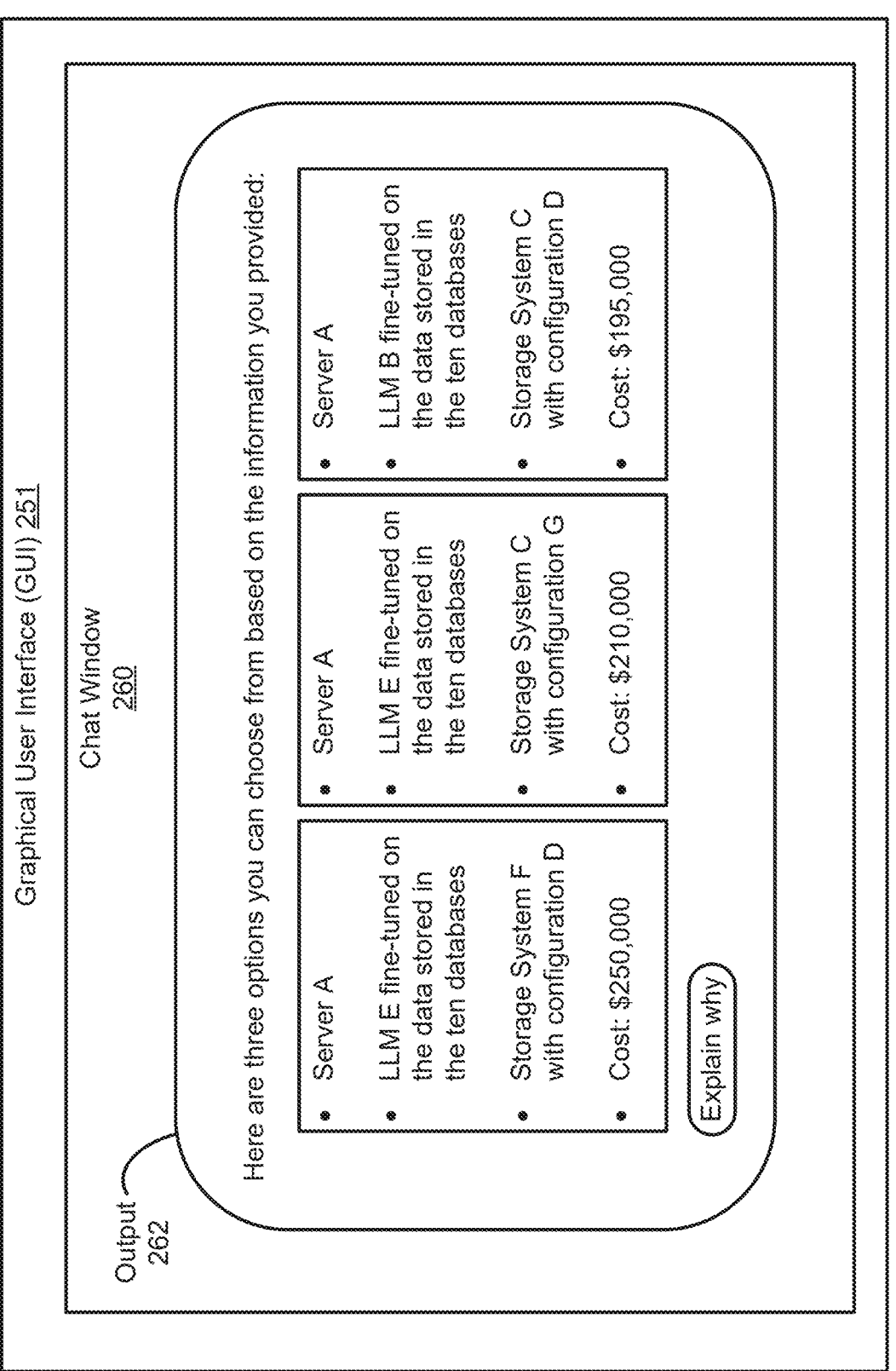

Turning to FIG. 2F, the example of output 208 (e.g., described in FIG. 2B) and graphical representation 238 are shown. Graphical representation 238 may include four nodes (e.g., 237, 239, 240, 241) that correspond to information elements of output 208. For example, the information elements of output 208 may include: (i) "re-install" shown as node 237, (ii) "disconnect and re-connect" shown as node 239, (iii) "driver F" shown as node 240, and (iv) "Bluetooth devices" shown as node 241. Edge 241 may represent a relationship between node 240 and node 237 (e.g., indicating that the re-installation is to be performed for driver F).

Turning to FIG. 2G, an example of output 216 (e.g., described in FIG. 2B) and graphical representation 243 are shown. Graphical representation 243 may represent information elements of output 216. Node 240 and node 237 may be grayed out in graphical representation 243 to indicate that node 240 and node 237 do not appear in graphical representation 243. Output 216, therefore, may include the text: "We recommend disconnecting and re-connecting all Bluetooth devices."

Consequently, during an output explainability process, graphical representation 238 (e.g., shown in FIG. 2F) of output 208 may be compared to graphical representation 243 (e.g., shown in FIG. 2G) of output 216 to obtain a difference (e.g., difference 220 described in FIG. 2B). Difference 220 may indicate that node 240 and node 237 are not present in graphical representation 243. Difference 220 may, therefore, be used to establish a first relationship between "operating system B" and "driver F." The first relationship may be added to explainability report 206.

Thus, the example shown in FIGS. 2C-2G may represent a first instance of information element removal to modify a prompt. However, information elements of a prompt may also be replaced with replacement information elements at any time during an output explainability process and/or after completion of a first output explainability process.

Turning to FIG. 2H, an example GUI is shown. GUI 251 may display prompt 242 (e.g., provided by a user) and graphical representation 244, which may illustrate information elements of prompt 242 (e.g., nodes 245, 246, 247, 248, 249, 250, 252, 253, and 254) and edges (e.g., edge 261) between the nodes which indicate relationships between the information elements of prompt 242.

A client may provide prompt 242, via GUI 251 as part of a request for a product (e.g., a computer system) recommendation request. Prompt 242 may include the following text: "I need a server that can host a large language model (LLM) trained on 5 terabytes (TB) data stored in ten databases. I also need a full backup for the databases. My budget is $200,000 for training and $250,000 for data backup." Information elements of prompt 242 may be extracted and represented as nodes.

For example, information elements of prompt 242 may include: (i) "$200,000 budget" shown as node 245, (ii) "training" shown as node 246, (iii) "server" shown as node 247, (iv) "LLM" shown as node 248, (v) "data" shown as node 249, (vi) "databases" shown as node 250, (vii) "5 TB" shown as node 252, (viii) "backup" shown as node 253, and "$250,000 budget" shown as node 254. Edge 261 may indicate, for example, that the $200,000 budget is to be allocated for training.

A user may elect to provide one or more replacement information elements for any of the nodes shown in graphical representation 244. For example, a user may select node 245 "$200,000 budget" and may offer two replacement information elements for node 245 (e.g., via a submission to a text box displayed as part of GUI 251). The two replacement elements may include other budget numbers such as "$210,000 budget" and "$250,000 budget."

Therefore, the system may generate a modified version of prompt 242 for each of the provided replacement information elements (e.g., one modified version of prompt 242 where node 245 includes a budget of $210,000 and a second modified version of prompt 242 where node 245 includes a budget of $250,000).

Turning to FIG. 2I, an example of three outputs generated based on prompt 242 and the provided replacement information elements is shown. For example, prompt 242 may be provided by the client via a chat window (e.g., chat window

260) displayed via GUI 251. Output 262 may be generated and provided via chat window 260 to the client.

Output 262 may include: (i) human-interpretable text indicating that three product recommendations were generated based on the provided prompt (e.g., one for each budget), (ii) a first product recommendation that falls within the $250,000 budget, (iii) a second product recommendation that falls within the $210,000 budget, and (iv) a third product recommendation that falls within the $200,000 budget. The client may choose to select the "explain why" button below the three product recommendations to obtain an explainability report (not shown) for each of the three product recommendations.

Graphical representations of each portion of output 262 may also be available via GUI 251 (not shown). By allowing the client to select information elements (e.g., via nodes on a graphical representation of a prompt, via other methods), the client may be able to explore impact of modifying a portion of the prompt on the output generated by the generative AI model.

Returning to FIG. 2H, replacement information elements may be obtained for node 245 according to an information element replacement schema (not shown). The information element replacement schema, for example, may indicate that three information elements are to be selected at random and two replacement information elements are to be retrieved for each of the selected information elements. The two replacement information elements may be generated via a retrieval augmented generation (RAG) process and/or via other processes. Therefore, product recommendations for a range of budgets may be presented to the client without the client providing the alternate values for node 245. The information element replacement schema may be obtained from the downstream consumer, from a subject matter expert, from a manufacturer of a hardware component, and/or from another entity.

Figure 3A:
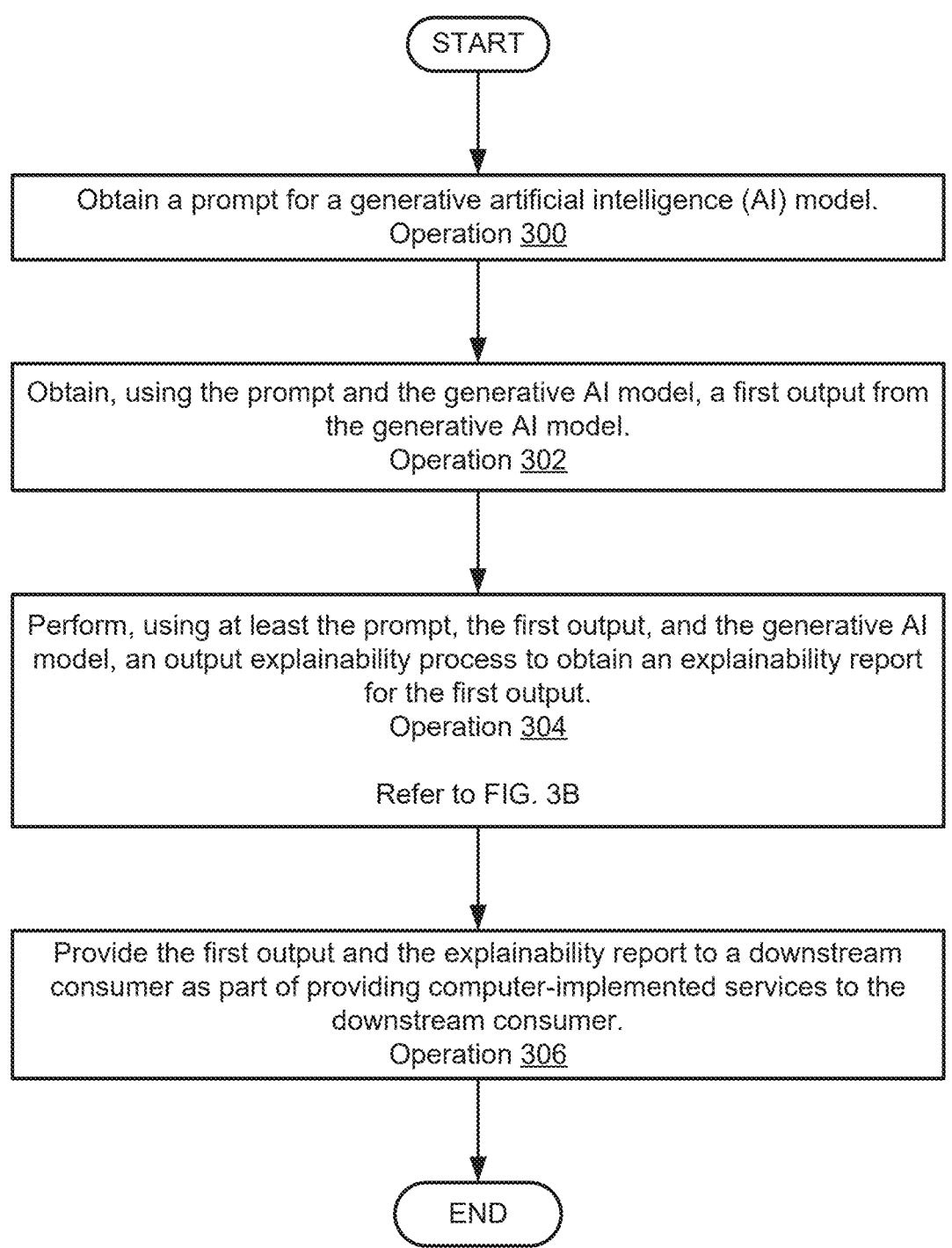

As discussed above, the components of FIG. 1 may perform various methods to manage a data processing system. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of providing computer-implemented services using generative AI models in accordance with an embodiment is shown. The method may be performed, for example, by any of the components of the system of FIG. 1, and/or other components not shown therein.

At operation 300, a prompt for a generative AI model may be obtained. Obtaining the prompt for the generative AI model may include: (i) reading the prompt from storage, (ii) receiving (e.g., via a communication system) the prompt from another entity, (iii) receiving the prompt as part of user feedback submitted via a GUI (e.g., a chat interface displayed on the user's device), and/or (iv) other methods.

At operation 302, a first output from the generative AI model may be obtained using the prompt and the generative AI model. Obtaining the first output may include: (i) feeding the prompt into the generative AI model as ingest and obtaining the first output from the generative AI model, (ii) providing the prompt to another entity responsible for operating the generative AI model and receiving the first output from the entity in response, and/or (iii) other methods.

At operation 304, an output explainability process may be performed using at least the prompt, the first output, and the generative AI model to obtain an explainability report for the first output. The explainability report may indicate relationships between first information elements of the prompt and second information elements of the first output. The relationships may be based, at least in part, on a second output generated by the generative AI model using a modified prompt and the modified prompt may be based on the prompt.

Performing the output explainability process may include: (i) iteratively perturbating information content of the prompt to obtain perturbated prompts, (ii) evaluating the perturbated prompts using the generative AI model to obtain perturbated outputs, (iii) using the perturbated prompts and the perturbated outputs to identify the relationships between the first information elements and the second information elements, and/or (iv) other methods.

Iteratively perturbating the information content of the prompt may include: (i) during a first perturbation of the information content of the prompt, removing a first information element of the first information elements to obtain a first modified prompt, (ii) during a second perturbation of the information content of the prompt, removing a second information element of the first information elements to obtain a second modified prompt, and/or (iii) other methods. Iteratively perturbating the information content of the prompt may include any number of perturbations to obtain any number of perturbated prompts.

Iteratively perturbating the information content of the prompt may also include: (i) replacing the first information element of the first information elements with a first replacement information element to obtain a third modified prompt, (ii) replacing the first information element of the first information elements with a second replacement information element to obtain a fourth modified prompt, and/or (iii) other methods.

Evaluating the perturbated prompts using the generative AI model to obtain perturbated outputs may include: (i) obtaining the perturbated prompts (e.g., the modified prompts), (ii) feeding each perturbated prompt of the perturbated prompts into the generative AI model to obtain the perturbated outputs, (iii) providing the perturbated prompts to another entity responsible for operating the generative AI model, and/or (iv) other methods.

Using the perturbated prompts and the perturbated outputs to identify the relationships between the first information elements and the second information elements may include: (i) obtaining the first information elements (e.g., using natural language processing and/or object recognition algorithms to extract data from text or images), (ii) obtaining information elements for each of the perturbated outputs (e.g., via methods similar to those described with respect to obtaining the first information elements), (iii) comparing the first information elements of the prompt to information elements of each of the perturbated outputs to obtain differences between the first information elements and the information elements of each of the perturbated outputs, and/or (iv) establishing, based on the differences and information elements that were modified to generate the perturbated prompts, the relationships.

Refer to FIG. 3B for an example iteration (e.g., one instance of perturbating the prompt to obtain a perturbated prompt, evaluating the perturbated prompt using the generative AI model to obtain a perturbated output, and using the perturbated output to establish a first relationship of the relationships). Refer to FIG. 2B for additional details regarding using differences to establish relationships between information elements of a prompt and information elements of an output.

At operation 306, the first output and the explainability report may be provided to a downstream consumer as part of providing computer-implemented services to the downstream consumer. Providing the first output and the explainability report to the downstream consumer may include: (i) transmitting the first output and the explainability report to the downstream consumer in the form of a message via a communication system, (ii) displaying the first output and the explainability report to the downstream consumer via a GUI (e.g., refer to FIGS. 2C-2I for examples of displaying information via the GUI), (iii) storing the first output and the explainability report in a shared storage with the downstream consumer, and/or (iv) other methods.

The method may end following operation 306.

Turning to FIG. 3B, a second flow diagram illustrating a method of providing computer-implemented services using generative AI models in accordance with an embodiment is shown. The method may be performed, for example, by any of the components of the system of FIG. 1, and/or other components not shown therein. The method shown in FIG. 3B may be at least a partial expansion of operation 304. For example, the operations shown in FIG. 3B may include a first iteration of multiple iterations included in operation 304.

At operation 310, a prompt modification process may be performed using the prompt to obtain a modified prompt. Performing the prompt modification process may include: (i) obtaining, using the prompt and the first output (e.g., obtained using the generative AI model and the prompt in operation 302 of FIG. 3A), first information elements of the prompt and second information elements of the first output, and/or (ii) other methods.

Performing the prompt modification process may also include at least one action selected from a list of actions consisting of: (i) removing a first information element of the first information elements to obtain the modified prompt, and (ii) replacing the first information element with a replacement information element to obtain the modified prompt.

Obtaining the first information elements and the second information elements may include: (i) utilizing an algorithm, model, and/or rule set to perform natural language processing and/or object recognition to extract the first information elements from the prompt and the second information elements from the first output, (ii) providing the prompt and the first output to another entity responsible for extracting the first information elements and the second information elements, and/or (iii) other methods.

Removing the first information element of the first information elements to obtain the modified prompt may include: (i) selecting the first information element (e.g., randomly, based on a schema, based on feedback from a downstream consumer), (ii) deleting the first information element from the first information elements, (iii) using a model (e.g., a second generative AI model) to create the modified prompt based on the remaining information elements, and/or (iv) other methods.

Replacing the first information element with the replacement information element to obtain the modified prompt may include: (i) deleting the first information element from the prompt, (ii) adding the replacement information element to the prompt to replace the first information element (e.g., a first budget may be replaced with a second budget), (iii) providing the prompt and the replacement information element to another entity responsible for replacing the first information element, and/or (iv) other methods.

If the at least one action performed as part of the prompt modification process includes replacing the first information element, a replacement information element may be obtained prior to replacing the first information element. The replacement information element may be obtained based on the first information element and an information element replacement schema.

Obtaining the replacement information element may include: (i) obtaining the information element replacement schema (e.g., from storage, from another entity via a communication system, from a downstream consumer via a GUI), (ii) reading instructions from the information element replacement schema (e.g., for selecting the first information element, for obtaining the replacement information element), (iii) selecting, based on the information element replacement schema, the first information element (e.g., randomly, based on a hierarchy for preferential selection of different types of information elements), (iv) performing a search process (e.g., a lookup process, a RAG process) using the first information element to obtain one or more replacement information elements (e.g., from a database, from another entity, from any number of other data sources), and/or (v) other methods.

Performing the prompt modification process may also include, if the at least one action includes replacing the first information element: (i) displaying, via a GUI, at least the first information elements to a user (e.g., a client, a downstream consumer), (ii) obtaining, via an interaction with the GUI, feedback from the user that includes the replacement information element, and/or (iii) other methods.

Displaying at least the first information elements to the user may include: (i) obtaining a first graphical representation of the first information elements, (ii) populating the GUI with the first graphical representation, and/or (iii) other methods.

The first graphical representation may include: (i) a first set of nodes that correspond to the first information elements, and (ii) first edges that indicate relationships between the first set of the nodes.

Obtaining the first graphical representation may include: (i) executing a graph generation algorithm or feeding the first information elements into an inference model to obtain the first set of nodes and internal representations (e.g., descriptors) for the first set of nodes, (ii) performing an analysis process, using the first set of the information elements and supplementary information, to obtain the first edges (e.g., indicating patterns of data flows, data dependencies, workload performance for various entities), and/or (iii) other methods.

Populating the GUI with the first graphical representation may include: (i) uploading the first graphical representation (e.g., via an application programming interface) so that the first graphical representation is available to the user via the GUI, (ii) providing the first graphical representation to another entity responsible for uploading the first graphical representation to the GUI, and/or (iii) other methods.

Obtaining the feedback from the user may include: (i) receiving (e.g., via an application programming interface) a notification that the user provided the user feedback (e.g., via selecting one or more buttons on the GUI, via entering text into a text box on the GUI), (ii) reading the user feedback from storage, the user feedback being previously extracted from the GUI, and/or (iii) other methods. Refer to FIGS. 2H-2I for an example of providing user feedback via the GUI.

At operation 312, a second output may be obtained from the generative AI model using the modified prompt and the generative AI model. Obtaining the second output may include: (i) feeding the second output into the generative AI model and obtaining the second output from the generative AI model in response, (ii) providing the second output to another entity responsible for operating the generative AI model and receiving the second output in response from the other entity, and/or (iii) other methods.

At operation 314, third information elements of the second output may be obtained using the second output. Obtaining the third information elements may include: (i) performing any algorithm, model, or rule set for extracting information from text or images (e.g., object recognition, natural language processing) to generate the third information elements based on the second output, (ii) reading the third information elements from storage, (iii) providing the second output to another entity responsible for extracting the third information elements, and/or (iv) other methods.

At operation 316, second information elements of the first output may be compared to the third information elements of the second output to obtain a difference. Comparing the second information elements and the third information elements may include: (i) obtaining a second graphical representation of the second information elements, (ii) obtaining a third graphical representation of the third information elements, (iii) identifying, using the second graphical representation and the third graphical representation, one or more nodes of the second set of the nodes that is not present in the third graphical representation, and/or (iv) other methods.

Obtaining the second graphical representation may include methods similar to those described with respect to generating the first graphical representation (e.g., feeding the second information elements into a graph generation algorithm or model).

Obtaining the third graphical representation may also include method similar to those described with respect to generating the first graphical representation.

Identifying the one or more nodes of the second set of nodes that is not present in the third graphical representation may include: (i) executing instructions for a graph comparison algorithm to obtain the difference, the difference indicating that a second information element (e.g., and, therefore a node) is not present in the third graphical representation, (ii) concluding, based on the difference, that the modification to the prompt (e.g., removal and/or replacement of the first information element) is related to the second information element being absent from the third graphical representation, and/or (iii) other methods.

Therefore, the first relationship may be established between: (i) removal of the first information element from the prompt and (ii) absence of the second information element in the second output.

Comparing the second information elements and the third information elements may also include identifying a third information element that is included in the third information elements (e.g., from the second output) that is not included in the second information elements (e.g., from the first output). Therefore, the third information element may have been generated by the generative AI model as a result of the removal and/or replacement of the first information element. Consequently, the first relationship may also indicate that appearance of the third information element may be related to the removal and/or replacement of the first information element.

At operation 318, the explainability report may be populated, based on the difference, with at least the first relationship. Populating the explainability report with at least the first relationship may include: (i) generating, using a second generative AI model, human-interpretable text summarizing the first relationship, (ii) adding the human-interpretable text summarizing the first relationship to the explainability report, (iii) adding one or more graphical representations (e.g., the first graphical representation, the second graphical representation, the third graphical representation) to the explainability report, and/or (iv) other methods.

The method may end following operation 318.

Thus, as illustrated above, embodiments disclosed herein may provide systems and methods usable to provide computer-implemented services using generative AI models. By providing an explainability report to a downstream consumer along with an output generated by the generative AI model in response to a prompt, a likelihood of the output meeting needs of the downstream consumer may be increased.

Figure 4:
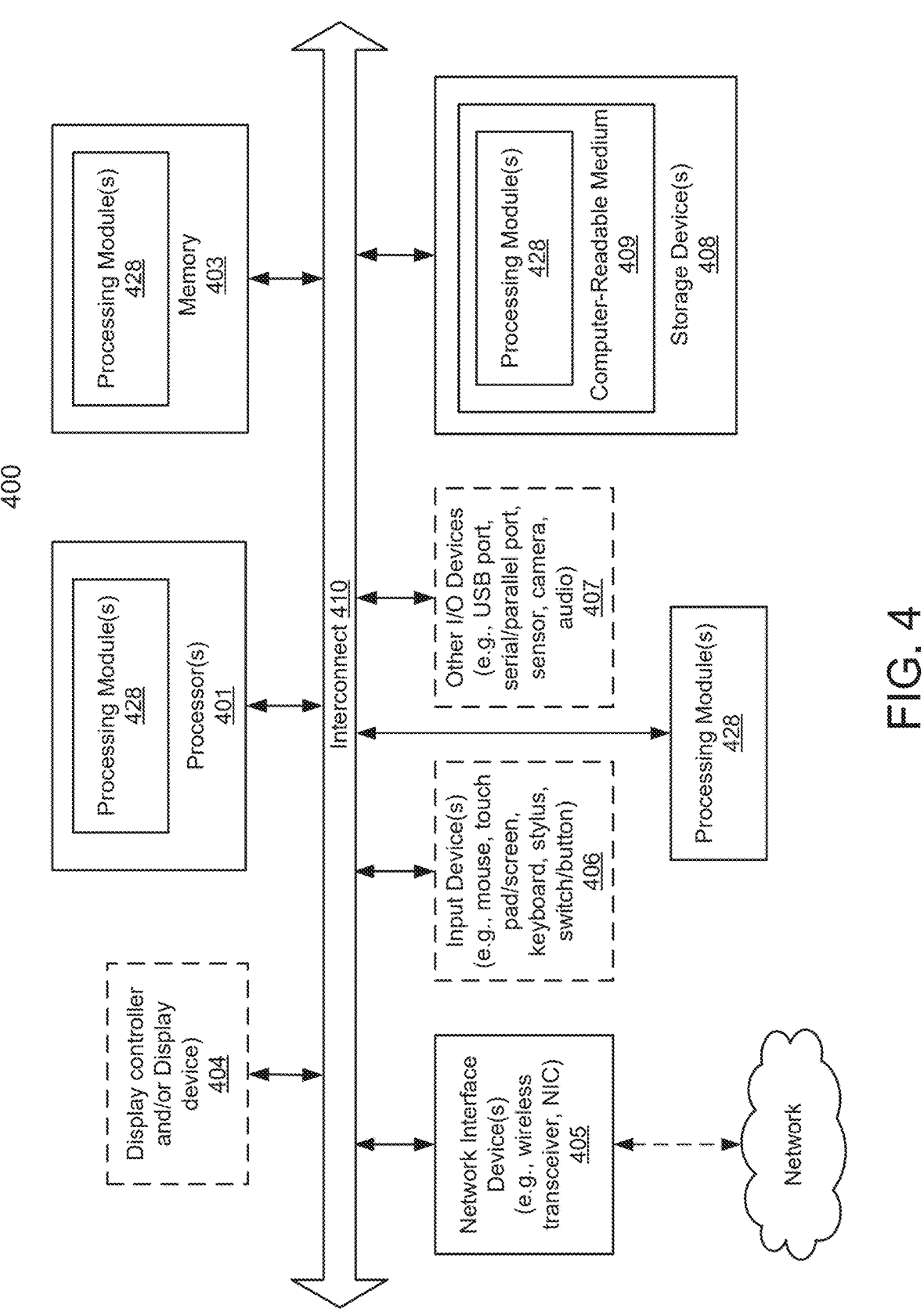
FIG. 4 shows a block diagram illustrating a data processing system in accordance with an embodiment.

Any of the components illustrated in FIGS. 1-2I may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing computer-implemented services using generative artificial intelligence (AI) models, the method comprising:

obtaining a prompt for a generative AI model of the generative AI models;

obtaining, using the prompt and the generative AI model, a first output from the generative AI model;

performing, using at least the prompt, the first output, and the generative AI model, an output explainability process to obtain an explainability report for the first output, the explainability report indicating relationships between first information elements of the prompt and second information elements of the first output, and the relationships are based, at least in part, on a second output generated by the generative AI model using a modified prompt and the modified prompt being based on the prompt; and providing the first output and the explainability report to a downstream consumer as part of providing computer-implemented services to the downstream consumer.

2. The method of claim 1, wherein performing the output explainability process comprises:

performing, using the prompt, a prompt modification process to obtain the modified prompt;

obtaining, using the modified prompt and the generative AI model, the second output from the generative AI model;

obtaining, using the second output, third information elements of the second output;

comparing the second information elements of the first output and the third information elements of the second output to obtain a difference; and populating, based on the difference, the explainability report with at least a first relationship of the relationships.

3. The method of claim 2, wherein performing the prompt modification process comprises:

obtaining, using the prompt and the first output, the first information elements and the second information elements; and performing at least one action selected from a list of actions consisting of:

removing a first information element of the first information elements to obtain the modified prompt; and replacing the first information element with a replacement information element to obtain the modified prompt.

4. The method of claim 3, wherein performing the prompt modification process further comprises:

in an instance of the performing where the at least one action comprises replacing the first information element:

prior to replacing the first information element:

obtaining, based on the first information element and an information element replacement schema, the replacement information element.

5. The method of claim 3, wherein performing the prompt modification process further comprises:

in an instance of the performing where the at least one action comprises replacing the first information element:

24 prior to replacing the first information element:

displaying, via a graphical user interface (GUI), at least the first information elements to a user; and obtaining, via an interaction with the GUI, feedback from the user, the feedback comprising the replacement information element.

6. The method of claim 5, wherein displaying the at least the first information elements to the user comprises:

obtaining a first graphical representation of the first information elements, the first graphical representation comprising:

a first set of nodes that correspond to the first information elements, and first edges that indicate relationships between the first set of the nodes; and populating the GUI with the first graphical representation.

7. The method of claim 5, wherein comparing the second information elements of the first output and the third information elements of the second output comprises:

obtaining a second graphical representation of the second information elements, the second graphical representation comprising:

a second set of nodes that correspond to the second information elements, and second edges that represent relationships between the second set of the nodes;

obtaining a third graphical representation of the third information elements, the third graphical representation comprising:

a third set of nodes that correspond to the third information elements, and third edges that represent relationships between the third set of the nodes; and identifying, using the second graphical representation and the third graphical representation, one or more nodes of the second set of the nodes that is not present in the third graphical representation.

8. The method of claim 7, wherein the first output comprises a second information element and the second output does not comprise the second information element.

9. The method of claim 8, wherein the second output comprises a third information element and the first output does not comprise the third information element.

10. The method of claim 7, wherein the second graphical representation and the third graphical representation are displayed to the user via the GUI.

11. The method of claim 1, wherein performing the output explainability process comprises:

iteratively perturbating information content of the prompt to obtain perturbated prompts;

evaluating the perturbated prompts using the generative AI model to obtain perturbated outputs; and using the perturbated prompts and the perturbated outputs to identify the relationships between the first information elements and the second information elements.

12. The method of claim 1, wherein the generative AI model is a large language model (LLM).

13. A non-transitory machine-readable medium having instructions stored therein, which when executed by a processor, cause the processor to perform operations for providing computer-implemented services using generative artificial intelligence (AI) models, the operations comprising:

obtaining a prompt for a generative AI model of the generative AI models;

obtaining, using the prompt and the generative AI model, a first output from the generative AI model;

performing, using at least the prompt, the first output, and the generative AI model, an output explainability process to obtain an explainability report for the first output, the explainability report indicating relationships between first information elements of the prompt and second information elements of the first output, and the relationships are based, at least in part, on a second output generated by the generative AI model using a modified prompt and the modified prompt being based on the prompt; and providing the first output and the explainability report to a downstream consumer as part of providing computer-implemented services to the downstream consumer.

14. The non-transitory machine-readable medium of claim 13, wherein performing the output explainability process comprises:

performing, using the prompt, a prompt modification process to obtain the modified prompt;

obtaining, using the modified prompt and the generative AI model, the second output from the generative AI model;

obtaining, using the second output, third information elements of the second output;

comparing the second information elements of the first output and the third information elements of the second output to obtain a difference; and populating, based on the difference, the explainability report with at least a first relationship of the relationships.

15. The non-transitory machine-readable medium of claim 14, wherein performing the prompt modification process comprises:

obtaining, using the prompt and the first output, the first information elements and the second information elements; and performing at least one action selected from a list of actions consisting of:

removing a first information element of the first information elements to obtain the modified prompt; and replacing the first information element with a replacement information element to obtain the modified prompt.

16. The non-transitory machine-readable medium of claim 15, wherein performing the prompt modification process further comprises:

in an instance of the performing where the at least one action comprises replacing the first information element:

prior to replacing the first information element:

obtaining, based on the first information element and an information element replacement schema, the replacement information element.

17. A data processing system, comprising:

a processor; and a memory coupled to the processor to store instructions, which when executed by the processor, cause the processor to perform operations for providing computer-implemented services using generative artificial intelligence (AI) models, the operations comprising:

obtaining a prompt for a generative AI model of the generative AI models;

obtaining, using the prompt and the generative AI model, a first output from the generative AI model;

performing, using at least the prompt, the first output, and the generative AI model, an output explainability process to obtain an explainability report for the first output, the explainability report indicating relationships between first information elements of the prompt and second information elements of the first output, and the relationships are based, at least in part, on a second output generated by the generative AI model using a modified prompt and the modified prompt being based on the prompt; and providing the first output and the explainability report to a downstream consumer as part of providing computer-implemented services to the downstream consumer.

18. The data processing system of claim 17, wherein performing the output explainability process comprises:

performing, using the prompt, a prompt modification process to obtain the modified prompt;

obtaining, using the modified prompt and the generative AI model, the second output from the generative AI model;

obtaining, using the second output, third information elements of the second output;

comparing the second information elements of the first output and the third information elements of the second output to obtain a difference; and populating, based on the difference, the explainability report with at least a first relationship of the relationships.

19. The data processing system of claim 18, wherein performing the prompt modification process comprises:

obtaining, using the prompt and the first output, the first information elements and the second information elements; and performing at least one action selected from a list of actions consisting of:

removing a first information element of the first information elements to obtain the modified prompt; and replacing the first information element with a replacement information element to obtain the modified prompt.

20. The data processing system of claim 19, wherein performing the prompt modification process further comprises:

in an instance of the performing where the at least one action comprises replacing the first information element:

prior to replacing the first information element:

obtaining, based on the first information element and an information element replacement schema, the replacement information element.

* * * * *